(12) United States Patent
Resch et al.

(10) Patent No.: US 9,152,514 B2
(45) Date of Patent: Oct. 6, 2015

(54) REBUILDING A DATA SEGMENT IN A DISPERSED STORAGE NETWORK

(71) Applicant: CLEVERSAFE, INC., Chicago, IL (US)

(72) Inventors: Jason K. Resch, Chicago, IL (US); Andrew Baptist, Mt. Pleasant, WI (US); Timothy W. Markison, Mesa, AZ (US); Gary W. Grube, Barrington Hills, IL (US)

(73) Assignee: Cleversafe, Inc., Chicago, IL (US)

( * ) Notice: Subject to any disclaimer, the term of this patent is extended or adjusted under 35 U.S.C. 154(b) by 201 days.

(21) Appl. No.: 13/866,224

(22) Filed: Apr. 19, 2013

(65) Prior Publication Data

US 2013/0232378 A1    Sep. 5, 2013

Related U.S. Application Data

(63) Continuation-in-part of application No. 12/862,887, filed on Aug. 25, 2010, now Pat. No. 8,918,897.

(60) Provisional application No. 61/264,072, filed on Nov. 24, 2009.

(51) Int. Cl.
*G06F 7/04* (2006.01)
*G06F 17/30* (2006.01)
(Continued)

(52) U.S. Cl.
CPC ........ *G06F 11/2056* (2013.01); *G06F 11/1092* (2013.01); *G06F 21/64* (2013.01); *G06F 21/80* (2013.01)

(58) Field of Classification Search
CPC ............ G06F 11/1076; G06F 11/1092; G06F 11/1088; G06F 2211/1028; G06F 11/2056; G06F 21/64; G06F 21/80; H04L 9/085; H03M 13/154

USPC .............. 726/4, 17, 21, 27–30; 713/165, 167, 713/193–194; 714/2, 6.2, 6.22, 6.24, 6.32, 714/48, 54, 710, 746, 747, 755, 758, 760, 714/764, 799

See application file for complete search history.

(56) References Cited

U.S. PATENT DOCUMENTS 4,092,732 A    5/1978 Ouchi
5,454,101 A    9/1995 Mackay et al.
(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(Continued)

*Primary Examiner* — Shewaye Gelagay
*Assistant Examiner* — Trong Nguyen
(74) *Attorney, Agent, or Firm* — Garlick & Markison; Timothy W. Markison

(57) ABSTRACT

A method begins with a processing module storing a set of encoded data slices in memory of a dispersed storage network (DSN), where a data segment is encoded using an error coding dispersal storage function to produce the set of encoded data slices. The method continues with the processing module adding the data segment to a rebuilding list, where encoded data slices of data segments identified in the rebuilding list are checked via a rebuilding process to detect errors and, when one of the encoded data slices has an error, the rebuilding process rebuilds the one of the encoded data slices. The method continues with the processing module, in response to a condition, removing the data segment from the rebuilding list.

18 Claims, 21 Drawing Sheets

(51) Int. Cl.
*G06F 11/30* (2006.01)
*G06F 12/14* (2006.01)
*H04N 7/16* (2011.01)
*G06F 11/20* (2006.01)
*G06F 21/64* (2013.01)
*G06F 21/80* (2013.01)
*G06F 11/10* (2006.01)

(56) References Cited

U.S. PATENT DOCUMENTS

| | | | |
|---|---|---|---|
| 5,485,474 A * | 1/1996 | Rabin | 714/762 |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,571,351 B1 * | 5/2003 | Mitaru et al. | 714/6.12 |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,577,866 B1 * | 8/2009 | Fan et al. | 714/6.24 |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0120723 A1 * | 6/2003 | Bright et al. | 709/203 |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 * | 6/2005 | Schmisseur | 711/114 |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0156178 A1 * | 7/2006 | Lee et al. | 714/758 |
| 2006/0224603 A1 | 10/2006 | Correll, Jr. | |
| 2007/0079081 A1 * | 4/2007 | Gladwin et al. | 711/154 |
| 2007/0079082 A1 * | 4/2007 | Gladwin et al. | 711/154 |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0183975 A1 * | 7/2008 | Foster et al. | 711/153 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

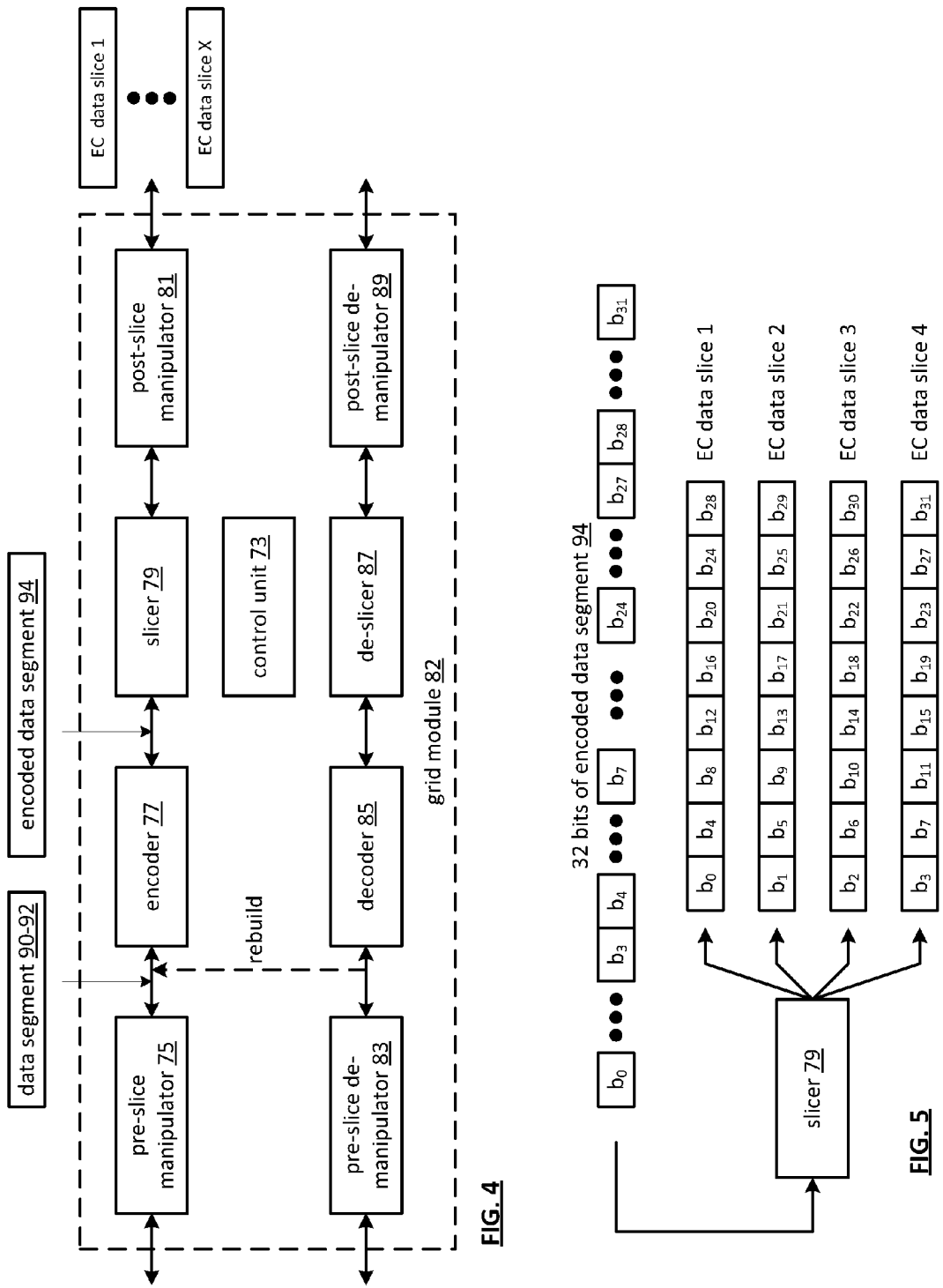

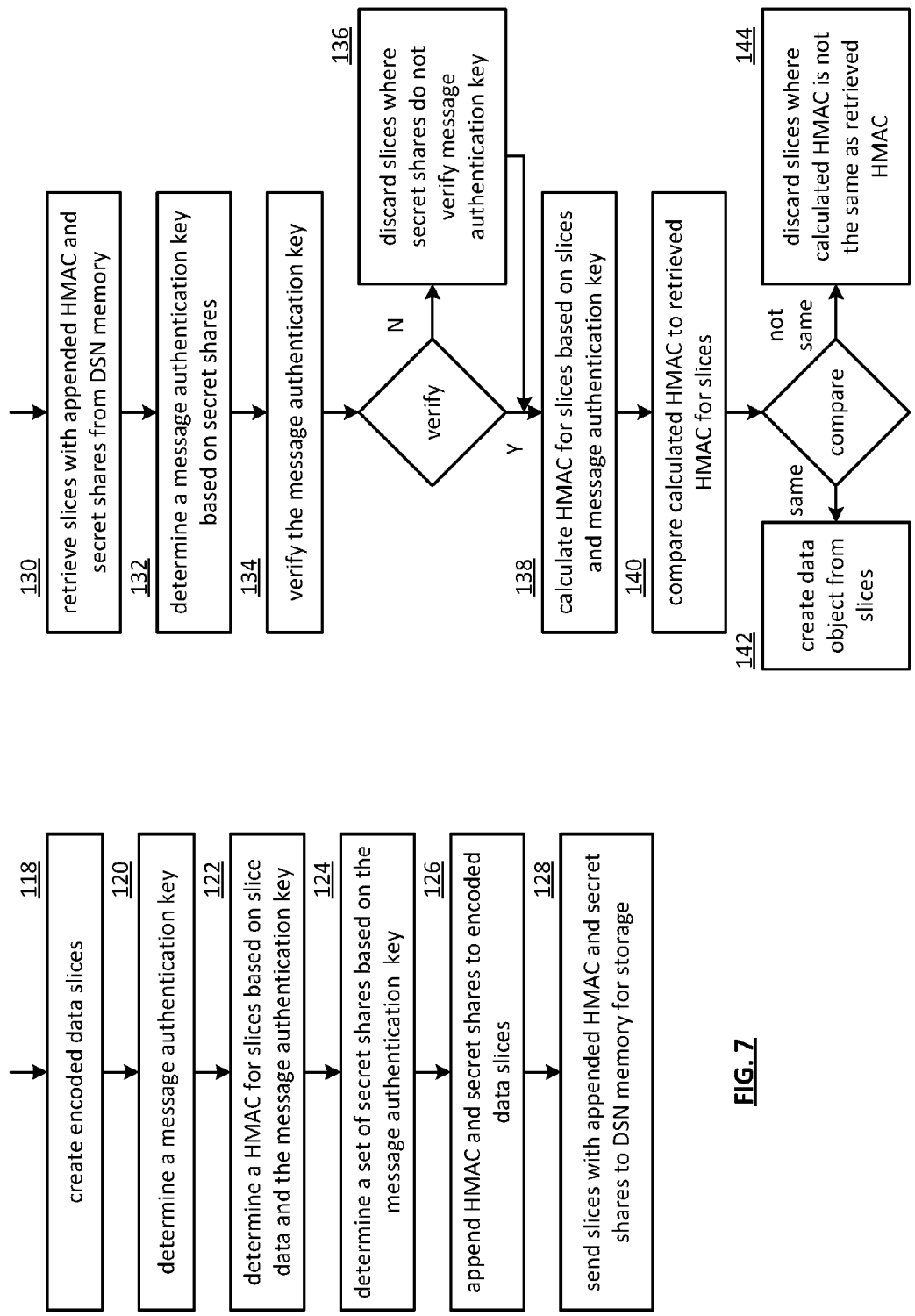

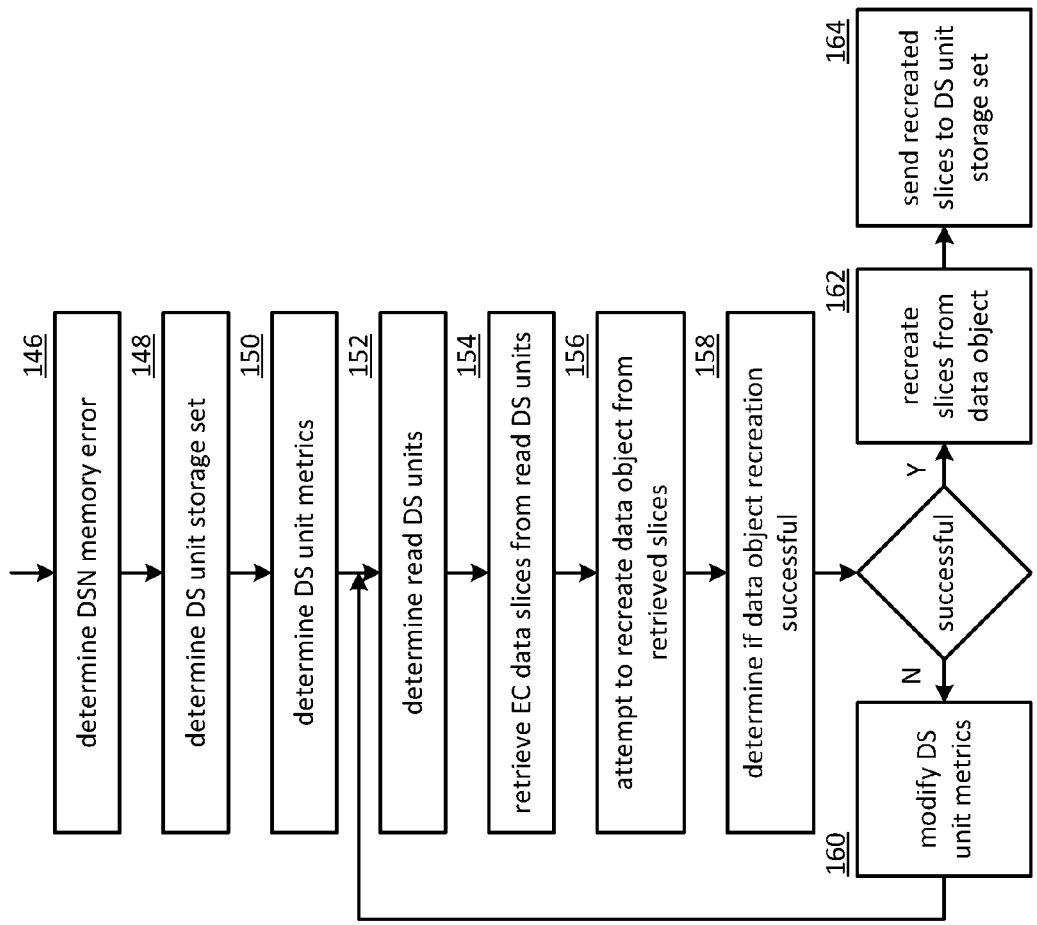

ency issue.

REBUILDING A DATA SEGMENT IN A DISPERSED STORAGE NETWORK

CROSS REFERENCE TO RELATED PATENTS

The present U.S. Utility patent application claims priority pursuant to 35 U.S.C. §120, as a continuation-in-part (CIP), to the following U.S. Utility patent application which is hereby incorporated herein by reference in its entirety and made part of the present U.S. Utility patent application for all purposes:
1. U.S. Utility application Ser. No. 12/862,887, entitled "DISPERSED STORAGE NETWORK DATA SLICE INTEGRITY VERIFICATION," filed Aug. 25, 2010, now U.S. Pat. No. 8,918,897, issued on Dec. 23, 2014, which claims priority pursuant to 35 U.S.C. §119(e) to the following U.S. Provisional Patent Application:
   a. U.S. Provisional Application Ser. No. 61/264,072, entitled "DISTRIBUTED STORAGE NETWORK REBUILDING," filed Nov. 24, 2009.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to use a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 7 is a flowchart illustrating an example of generating integrity checking elements in accordance with the invention;

FIG. 8 is a flowchart illustrating an example of verifying encoded data slice integrity in accordance with the invention;

FIG. 9 is a flowchart illustrating an example of rebuilding encoded data slices in accordance with the invention;

DETAILED DESCRIPTION OF THE INVENTION

Figure 1:
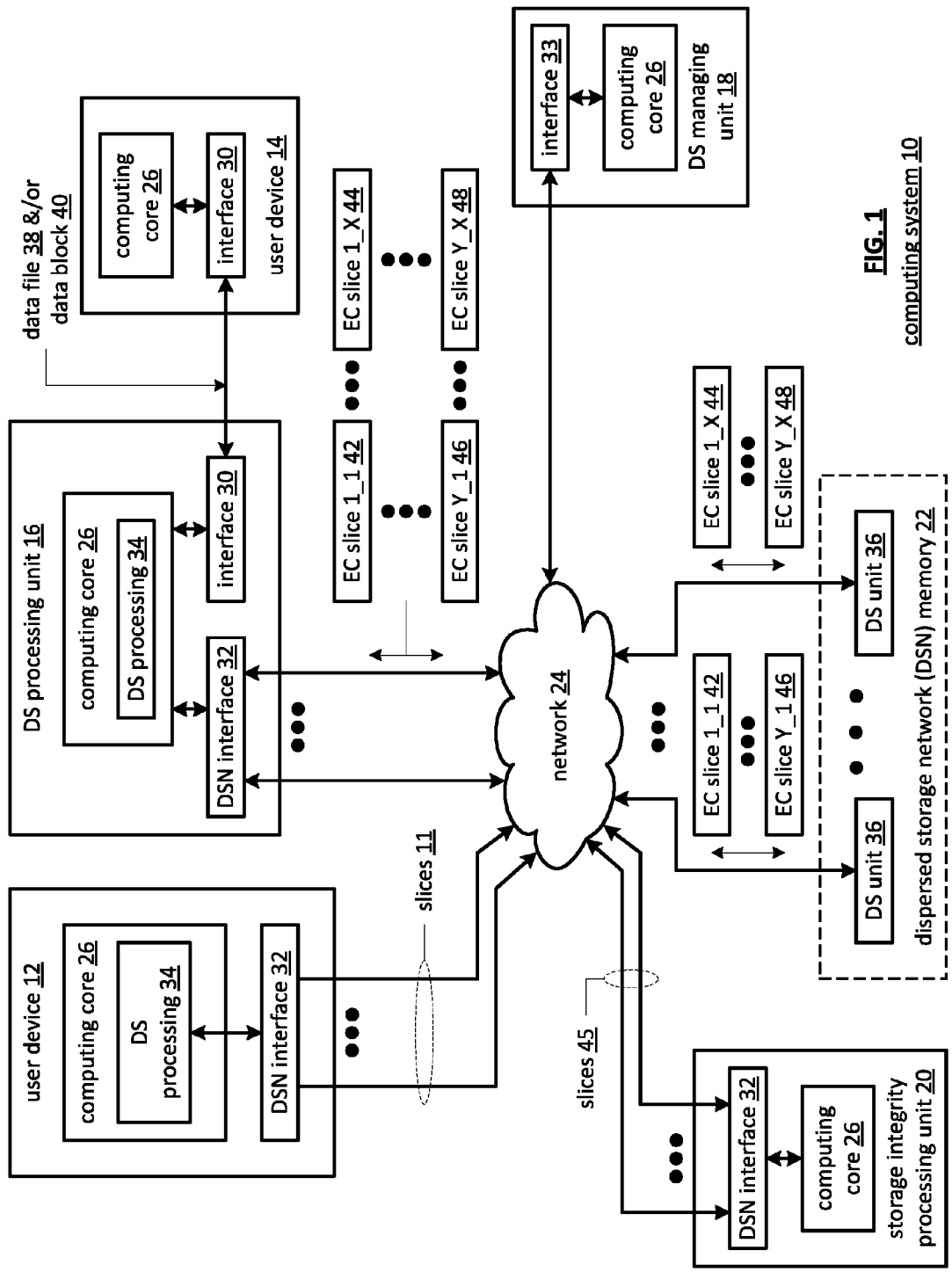
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-20.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the second type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-20.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
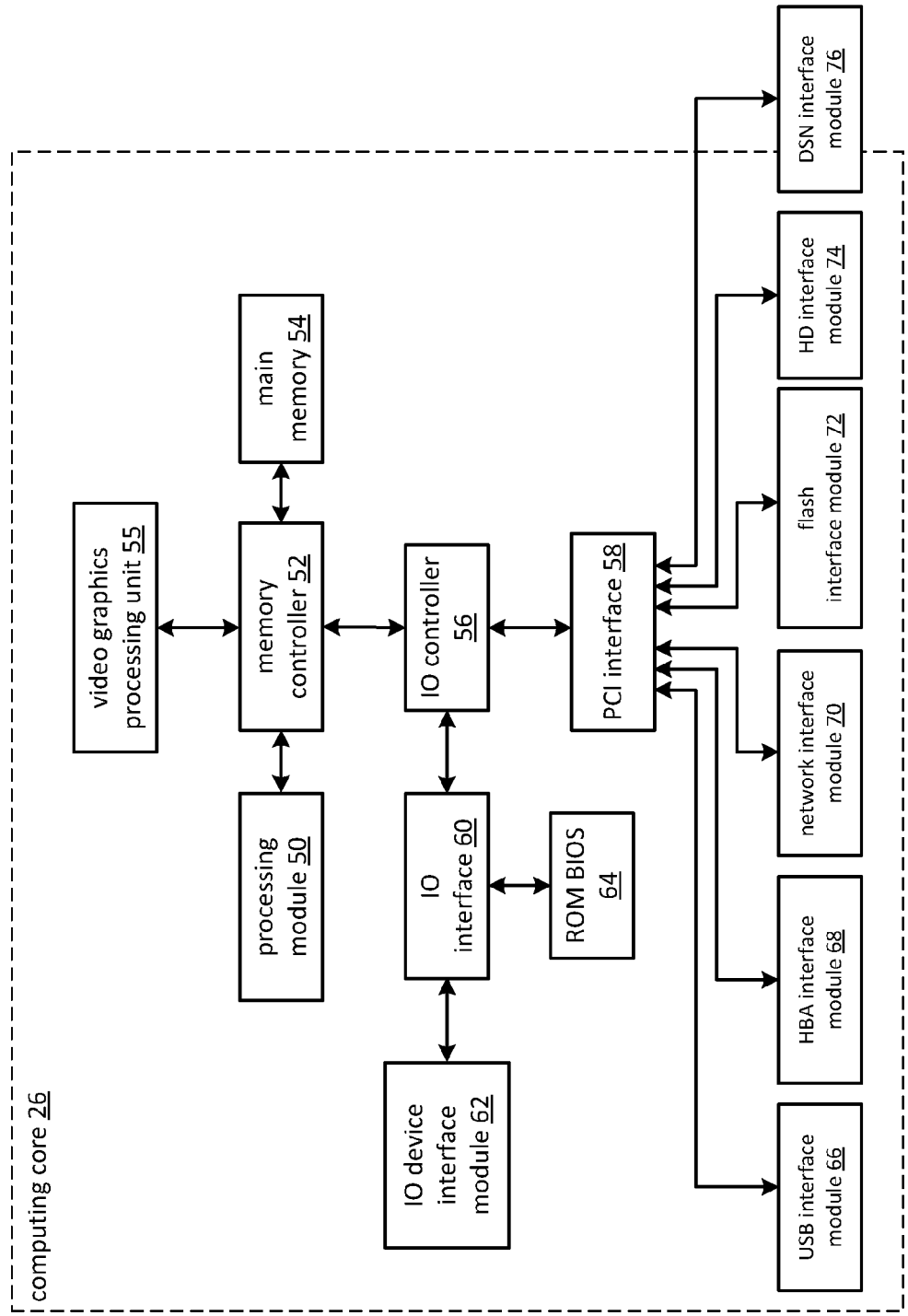
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the TO device interface module 62 and/or the memory interface modules may be collectively or individually referred to as TO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-20.

Figure 3:
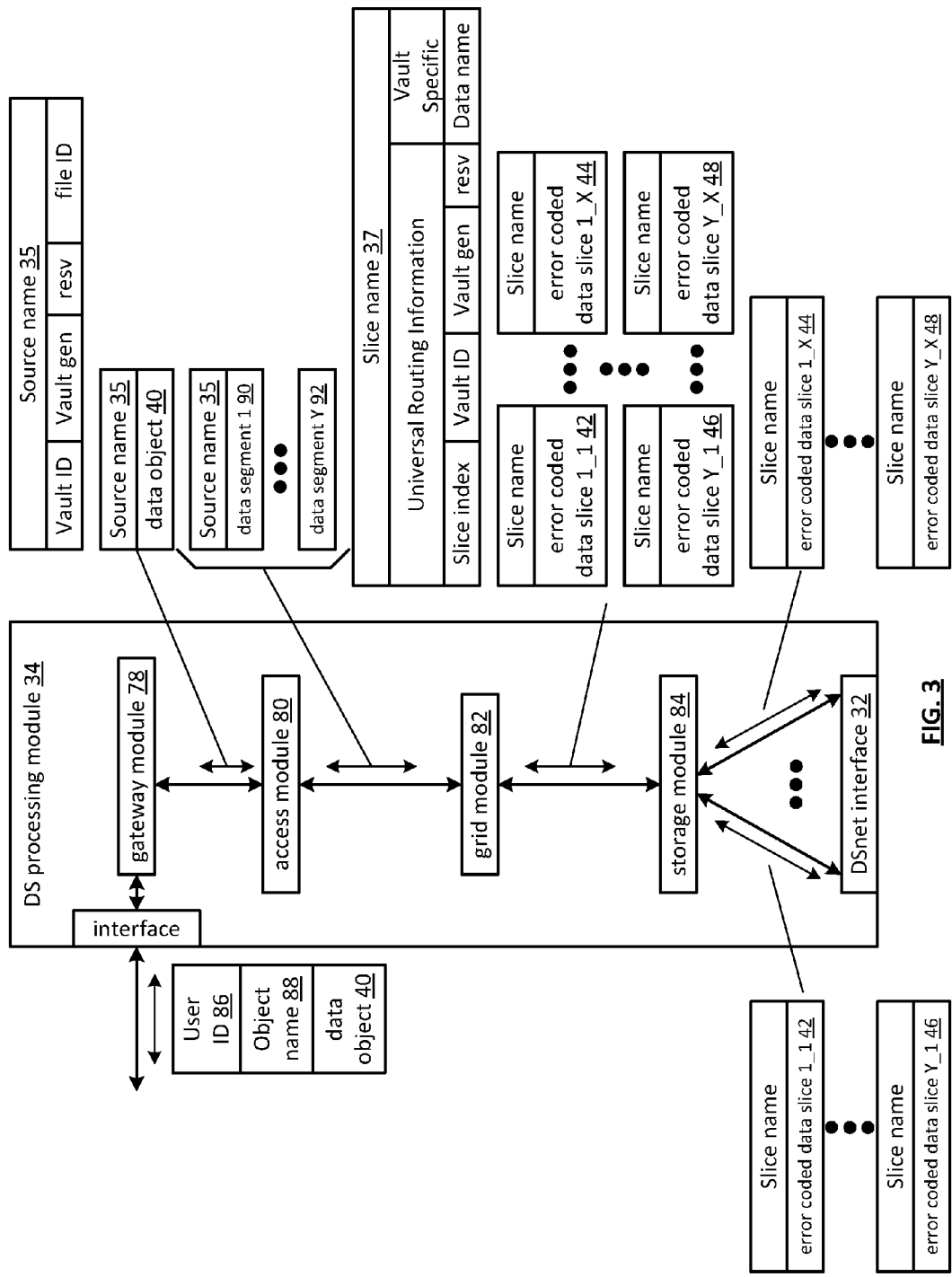
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name 35 may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
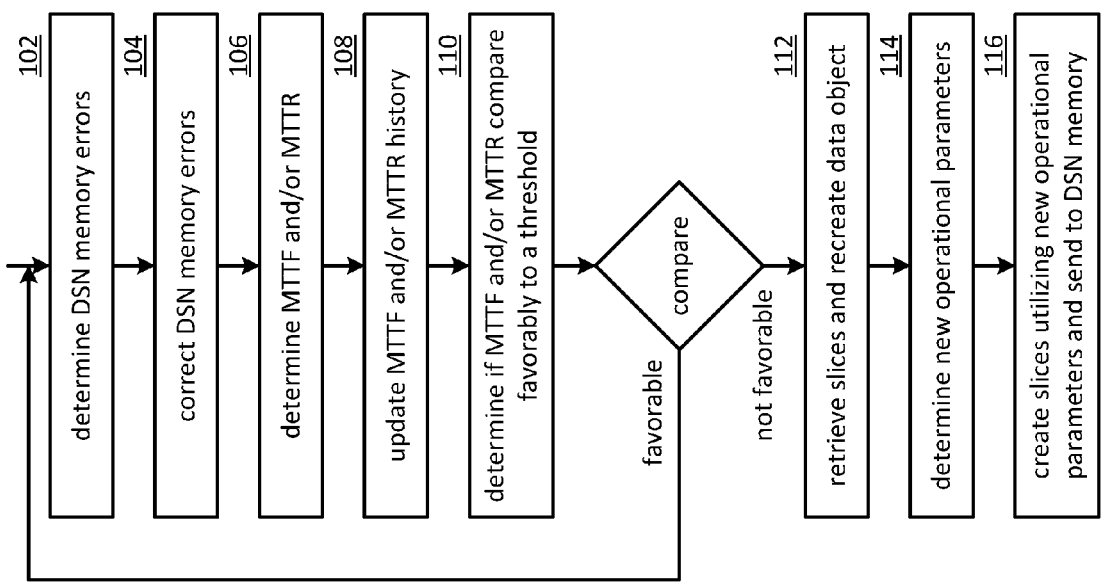
FIG. 6 is a flowchart illustrating an example of modifying an error coding dispersal storage function parameter in accordance with the invention.

FIG. 6 is a flowchart illustrating an example of modifying an error coding dispersal storage function parameter (e.g., an operational parameter). The method begins at step 102 where a DS processing determines dispersed storage network (DSN) memory errors. Such errors may include one or more of missing data slices, data slices with errors, corrupted data slices, tampered data slices, an offline DS unit, a network failure, and a DS unit memory failure (e.g., a failed disk drive). Such a determination may be based on one or more of a scan of slice names present in a DS unit, a memory test, a comparison of calculated slice checksums to stored checksums, an integrity test, a network element ping test, and a command.

The method continues with step 104 where the DS processing corrects the DSN memory errors. For example, the DS processing retrieves at least a read threshold number of data slices for a data segment corresponding to the data slice with the error, de-slicing the data slices, and decodes the data slices in accordance with the error coding dispersal storage function parameters to produce the data segment. Next, the DS processing encodes and slices the data segment in accordance with the error coding dispersal storage function parameters to produce a set of encoded data slices. The DS processing sends at least some data slices of the set of encoded data slices with a store command to the DSN memory for storage therein (e.g., the data slices are confirmed as stored in at least a write threshold number of DS units). Alternatively, or in addition to, the DS processing determines new error coding dispersal storage function parameters and encodes and slices the data segment in accordance with the new error coding dispersal storage function parameters to produce the set of encoded data slices. Next, the DS processing stores at least some data slices of the set of encoded data slices with a store command to the DSN memory for storage therein. Note that the DS processing may determine the new error coding dispersal storage function parameters based in part on reliability information as will be discussed in greater detail below.

At step 106, the DS processing unit determines mean time to failure (MTTF) and mean time to repair (MTTR) information where MTTF measures the time between detected DSN memory errors for the same memory and MTTR measures the time between detecting the DSN memory error and correcting the DSN memory error (e.g., the rebuilding time). Note that the MTTR may be longer when larger disk drives are utilized as the memory since it may take longer to read more data from the other pillars and then write more recreated slices to the memory. The DS processing calculates the MTTF and MTTR information by retrieving MTTF and MTTR history from storage (e.g., the history records are stored in one or more of the storage integrity processing unit and the DSN memory) and averaging the retrieved information with the current error detection scenario data. At step 108, The DS processing updates the MTTF and MTTR history by storing the MTTF and MTTR information.

The method continues at step 110 where the DS processing determines whether the MTTF compares favorably to a MTTF threshold and whether the MTTR compares favorably to a MTTR threshold. In an instance, the MTTF threshold and MTTR threshold are associated with one or more of a user, a group of users, a vault, a group of vaults, a DS unit, a group of DS units, and the whole computing system. The DS processing determines the MTTF threshold and MTTR threshold based on one or more of a vault lookup, a system memory lookup, a group of vaults lookup, and a command. In an example, the DS processing determines that the MTTF compares favorably to a MTTF threshold when the MMTF is greater than the MTTF threshold. For instance, the comparison is favorable when the MTTF is 10,000 hours and the MTTF threshold is 9,000 hours. In another example, the DS processing determines that the MTTR compares favorably to a MTTR threshold when the MMTR is less than the MTTR threshold. In an instance, the comparison is favorable when the MTTR is 1 hour and the MTTR threshold is 3 hours.

The method branches back to step 102 when the DS processing determines that the MTTF compares favorably to the MTTF threshold and the MTTR compares favorably to the MTTR threshold. The method continues to step 112 when the DS processing determines that either the MTTF does not compare favorably to the MTTF threshold or the MTTR does not compare favorably to the MTTR threshold. In an example, either the MTTF is less than the MTTF threshold or the MTTR is greater than the MTTR threshold. In an instance, failures are happening too often and when they do the rebuilding is taking too long.

At step 112, the DS processing retrieves slices from the affected vault(s) of the DSN memory error to recreate the data segments and data objects in part by retrieving, de-slicing, and decoding in accordance with the current error coding dispersal storage function parameters. At step 114, DS processing determines new error coding dispersal storage function parameters for the vault, which may include changing the parameters to improve the reliability and/or reduce the rebuild time. The new parameters may include the pillar width n, the read threshold, the write threshold, the encoding algorithm the slicing method etc. Such a determination may be based on one or more of the current parameters, the MTTF, the MTTR, the comparison of the MTTF to the MTTF threshold, the comparison of the MTTR to the MTTR threshold, an error message, a lookup, a predetermination, and a command. For example, the DS processing may change from a 16/10 system to a 32/20 system to improve reliability (e.g., pillar width 32/read threshold 20). At step 116, the DS processing creates new data slices of the data segments and data objects in accordance with the new error coding dispersal storage function parameters. The DS processing sends the new data slices to the DSN memory with a store command for storage in the DS units.

FIG. 7 is a flowchart illustrating an example of generating integrity checking elements. The method begins at step 118 where a processing module encodes a data segment in accordance with an error coding dispersal storage function to produce a set of encoded data slices. For example, the processing module encodes a data segment of a data object for storage. At step 120, the processing module determines a message authentication key wherein the message authentication key comprises at least one of an output of a random number generator, a cryptographic key, an integrity check of the cryptographic key, a hash function of the cryptographic key, a result of a table lookup, and a result of a retrieval. For example, the processing module determines the message authentication key by utilizing the output of the random number generator that is compatible with a key length of the message authentication key.

In another example, the processing module determines the message authentication key by combining the output of the random number generator with a hash of the output of the random number generator. Note that in this example, the hash may be subsequently utilized to determine the validity of the random number portion (e.g., a cryptographic key) of the message authentication key. The processing module may generate a first message authentication key for the data segment and generate a second message authentication key for a second data segment. For instance, the first message authentication key is substantially the same as the second message authentication key. In another instance, the first message authentication key is substantially not the same as the second message authentication key.

The method continues at step 122 where the processing module generates an authentication code based on the message authentication key and an encoded data slice of the set of encoded data slices. For example, the processing module generates the authentication code by one of performing a keyed-hash message authentication code (HMAC) generation function on the encoded data slice utilizing the message authentication key or by performing a cryptographic hash function algorithm on the encoded data slice utilizing the message authentication key. Examples of HMAC algorithms include a 16 byte HMAC-MD5 (e.g., message digest algorithm 5) and a 20 byte HMAC-SHA1 (e.g., secure hash algorithm). In addition, the processing module may generate a second authentication code based on the message authentication key and a second encoded data slice of the set of encoded data slices. For instance, the processing module may generate a set of authentication codes based on the message authentication key and each of the set of encoded data slices. Note that the authentication code may be used to facilitate verification of the integrity and/or authenticity of an encoded data slice.

The method continues at step 124 where the processing module encodes the message authentication key into a set of secret shares based on at least some of the set of DS units (e.g., a pillar number). In an example, the processing module assigns the message authentication key to a constant of a polynomial. The polynomial may include multiple constants and multiple variables. In an instance, the processing module assigns the message authentication key to a constant m when the polynomial is of a form of $y=mx+b$. The processing module assigns a unique identifier (e.g., the pillar number) of the corresponding one of the at least some of the set of DS units to a variable of the polynomial to produce a first assigned variable. In an instance, the processing module assigns the unique identifier to a variable x when the polynomial is of the form y=mx+b. In addition, the processing module may determine values for one or more other constants of the polynomial. Such a determination may be based on one or more of a lookup, a request, a message, the message authentication key, and a command.

The processing module solves the polynomial to produce a secret share based on the constant, the first assigned variable, and the one or more other constants. For instance, the processing module produces the secret share in accordance with the polynomial y=mx+b=80*2+15=175, when the message authentication key=m=80, the unique identifier=x=2 for pillar 2, and the other constant=b=15. In addition, the processing module may assign a second unique identifier of a second one of the at least some of the set of DS units to the variable of the polynomial to produce a second assigned variable followed by the processing module solving the polynomial to produce a second secret share of the set of secret shares based on the constant and the second assigned variable. For instance, the processing module produces the second secret share in accordance with the polynomial y=mx+b=80*3+15=255, when the message authentication key=m=80, the unique identifier=x=3 for pillar 3, and the other constant=b=15.

Alternatively, at step 124 the processing module encodes the message authentication key in accordance with an error coding dispersal storage function into the set of secret shares. For instance, the processing module encodes the message authentication key to produce an encoded message authentication key. Next, the processing module slices the encoded message authentication key to produce the set of secret shares.

At step 126, the processing module appends the authentication code associated with the encoded data slice to the encoded data slice. In addition, the processing module may append an authentication code associated with other encoded data slices of the set of encoded data slices. Further, the processing module appends the set of secret shares to associated encoded data slices of the set of encoded data slices. For example, the processing module appends a first secret share to a first encoded data slice and appends a second secret share to a second encoded data slice.

The method continues at step 128 where the processing module outputs the authentication code and the encoded data slice to a dispersed storage (DS) unit of a set of DS units for storage therein. In addition, the processing module may output the second authentication code and the second encoded data slice to a second DS unit of a set of DS units when there is more than one authentication code. The processing module outputs a secret share of the set of secret shares to a corresponding one of the at least some of the set of DS units for storage therein. In addition, the processing module may output the rest of the secret shares of the set of secret shares to corresponding DS units of the set of DS units for storage therein.

FIG. 8 is a flowchart illustrating an example of verifying encoded data slice integrity. The method begins at step 130 where a processing module issues a retrieval request to retrieve one or more encoded data slices, one or more authentication codes, and one or more secret shares from one or more DS units of a set of DS units. In an example, the processing module issues the retrieval request in response to receiving a data object retrieval request. In another example, the processing module issues that retrieval request in response to determining an encoded data slice error. The processing module receives secret shares of a set of secret shares to produce received secret shares in response to the retrieval request. The processing module receives encoded data slices of a set of encoded data slices to produce received encoded data slices in response to the retrieval request.

The method continues at step 132 where the processing module decodes the received secret shares in accordance with a secret share function to recapture a message authentication key when a threshold number of the secret shares is received. In an example, the processing module performs the secret share function by assigning a threshold number of unique identifiers (e.g. pillar numbers) of the threshold number of received secret shares to a first variable of a polynomial to produce an assigned value set of the first variable. For instance, the processing module assigns the unique identifiers to the variable x when the polynomial is of a form of y=mx+b (e.g., x=1 for pillar 1, x=2 for pillar 2, etc). Next, the processing module assigns the threshold number of received secret shares to a second variable of the polynomial to produce an assigned value set of the second variable. As a more specific example, the processing module assigns the threshold number of received secret shares to the variable y when the polynomial is of the form of y=mx+b (e.g., y=175 for pillar 2, y=255 for pillar 3, etc.). In addition, the processing module may determine values for one or more other constants of the polynomial (e.g., b=15 when the polynomial is of the form y=mx+b). Such a determination may be based on one or more of a lookup, a request, a message, the message authentication key, and a command. The processing module then solves for a constant of the polynomial (e.g., constant m when the polynomial is of the form y=mx+b) to produce the message authentication key based on the assigned value set of the first variable and the assigned value set of the second variable. For instance, y=mx+b, such that m=(y−b)/x=(175−15)/2=80=message authentication key.

Alternatively, the processing module decodes the received secret shares in accordance with an error coding dispersal storage function to recapture the message authentication key when a threshold number of the secret shares is received. For example, the processing module de-slices the received secret shares to produce de-sliced secret shares. Next, the processing module decodes the de-sliced secret shares to produce the message authentication key.

The method continues at step 134 where the processing module assigns a threshold number of unique identifiers of a second threshold number of received secret shares to the first variable of the polynomial to produce a second assigned value set of the first variable. Next, the processing module assigns the second threshold number of received secret shares to the second variable of the polynomial to produce a second assigned value set of the second variable. Next, the processing module solves for the constant of the polynomial to produce a second message authentication key based on the second assigned value set of the first variable and the second assigned value set of the second variable. In an instance, y=mx+b, such that m=(y−b)/x=(255−15)/3=80=the second message authentication key, when the secret share is 255, the pillar is 3, and the constant b=15.

Next, the processing module compares the second message authentication key with the message authentication key and indicates verification of the message authentication key when the comparing of the second message authentication key with the message authentication key is favorable (e.g. substantially the same). For example, the processing module indicates verification of the message authentication key when the comparison of the second message authentication key=80 to the message authentication key=80 indicates a favorable comparison. The method branches to step 138 when the processing module determines that the message authentication key is verified. The method branches to step 136 when the processing module determines that the message authentication key is not verified. At step 136, the processing module discards encoded data slices that corresponds (e.g., same pillar) to received secret shares that produced an invalid message authentication key. In addition, the processing module may send a delete command to the DSN memory to delete an encoded data slice associated with a secret share that produced the invalid message authentication key.

In another example, the processing module verifies the message authentication key based on received secret shares by testing more than one combination of received secret shares to determine which pillars may produce the invalid message authentication key. In an instance, the processing module verifies the message authentication key to be verified when decoding of all combinations of the threshold number of secret shares result in the same message authentication key. In another instance, the processing module determines the message authentication key to be not verified when the decoding of at least one of the threshold number of secret shares result in a different message authentication key than the decoding of at least one other of the threshold number of secret shares.

In yet another example, the processing module verifies the message authentication key based on comparing a received hash of the cryptographic key portion to a calculated hash of the cryptographic key portion. The processing module determines that the message authentication key is verified when the comparison indicates that the received hash of the cryptographic key portion is substantially the same as the calculated hash of the cryptographic key portion.

The method continues at step 138 where the processing module identifies a received encoded data slice of the received encoded data slices having an authentication code associated therewith when a threshold number of the encoded data slices is received. Next, the processing module performs a keyed-hash message authentication code generation or a cryptographic hash function algorithm on the received encoded data slice utilizing the message authentication key to produce a verification authentication code.

The method continues at step 140 where the processing module compares the verification authentication code with the authentication code. The processing module indicates verification of the authentication code when the comparing of the verification authentication code with the authentication code is favorable (e.g., substantially the same). Alternatively, the processing module identifies a second received encoded data slice of the received encoded data slices having a second authentication code associated therewith when the threshold number of the encoded data slices is received. Next, the processing module verifies the second authentication code based on the message authentication key and the second received encoded data slice (e.g., the processing module performs the keyed-hash message authentication code generation or the cryptographic hash function algorithm on the second received encoded data slice utilizing the message authentication key to produce a second verification authentication code for comparison to the second authentication code). Next, the processing module indicates verification of the authentication code when the first and second authentication codes are verified. The method branches to step 142 when the processing module determines that the received authentication code(s) are verified. The method branches to step 144 when the processing module determines that the received authentication code(s) are not verified.

At step 142, the processing module decodes the received encoded data slices in accordance with an error coding dispersal storage function to recapture a data segment. At step 144, the processing module discards encoded data slices associated with an authentication code that is not verified. In addition, the processing module may attempt to decode the received encoded data slices in accordance with the error coding dispersal storage function wherein the received encoded data slices are associated with verified authorization codes to recapture the data segment. In addition, the processing module may send a delete command to the DS unit associated with the received encoded data slice associated with the authentication code that is not verified to delete the encoded data slice associated with the authentication code that is not verified.

FIG. 9 is a flowchart illustrating an example of rebuilding encoded data slices. The method begins at step 146 where a DS processing determines a DSN memory error including a missing data slice, a corrupted data slice, an offline DS unit, a network failure, etc. Such a determination may be based on one or more of verification of slice name lists, validating a stored slice checksum with a calculated slice checksum, a disk drive status, a memory status, an error message, and a command. Note that the memory error determination may be associated with a background process and/or upon an active data slice retrieval sequence.

At step 148, the DS processing determines a DS storage unit associated with the DSN memory error. The storage set comprises the DS units assigned as the storage locations for the n pillars of the vault. Such a determination may be based on one or more of a vault lookup, a command, a predetermination, and the virtual DSN address to physical location table. At step 150, the DS processing determines DS unit metrics for the DS units of the associated DS storage set with the DSN memory error. The DS unit metrics includes one or more of a ping time from the DS processing to the DS unit, throughput, uptime, security performance, reliability performance, and previous retrieval results. Such a determination may be based on one or more of a vault lookup, a command, a predetermination, a history record, a previous measurement, and a real time measurement.

The method continues at step 152 where the DS processing determines read DS units to facilitate a desired slice retrieval sequence. Such a determination may be based on one or more of the DS unit metrics, an algorithm to choose the fastest response, a vault lookup, a command, a predetermination, a history record, a previous measurement, and a real time measurement. For example, the DS processing chooses DS units of pillars at the same site as the DS processing and in a second choice, chooses other DS units with the lowest ping times to facilitate fast retrieval.

At step 154, the DS processing retrieves EC data slices from the read DS units by sending a retrieval command with slice names to the read DS units and receiving retrieved slices. At step 156, the DS processing attempts to recreate the data object from the retrieved slices by de-slicing and decoding at least a read threshold k of the slices in accordance with an error coded dispersal storage function. At step 158, the DS processing determines whether the data object recreation is successful based on a read threshold number of retrieved slices. For example, the DS processing determines an unsuccessful data object recreation when at least one data segment does not have at least a read threshold number of retrieved slices to recreate the data segment. The method branches to step 162 when the DS processing determines that the data object recreation is successful. The method continues to step 160 when the DS processing determines that the data object recreation is not successful. At step 160, the DS processing modifies the DS unit metrics to indicate a previous unsuccessful retrieval. The method branches back to step 152 where the DS processing determines the read DS units to try again.

The method continues at step 162 where the DS processing recreates slices from the recreated data object in accordance with the error coded dispersal storage function. At step 164, the DS processing sends the recreated slices and slice names to the DS unit storage set with a store command to store the slices therein. In an example, the DS processing may send the slices to the DS unit(s) where the DSN memory error was detected. In another example, the DS processing may send the slices to the DS unit(s) where the DSN memory error was detected and at least one other DS unit of the DS unit storage set. Note that the DS processing may send the slices to the DS units one pillar at a time, all at once as a batch, or a combination thereof.

Figure 10:
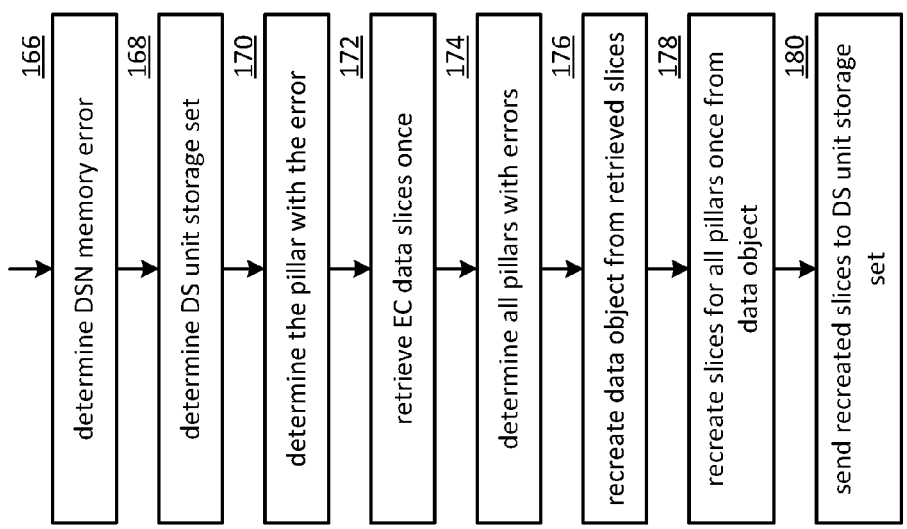
FIG. 10 is a flowchart illustrating another example of rebuilding encoded data slices in accordance with the invention.

FIG. 10 is a flowchart illustrating another example of rebuilding encoded data slices. The method begins at step 166 where a DS processing determines a DSN memory error including a missing slice, a corrupted slice, an offline DS unit, a network failure, etc. Such a determination may be based on one or more of verification of slice name lists, validating a stored slice checksum with a calculated slice checksum, a disk drive status, a memory status, an error message, and a command. Note that the memory error determination may be associated with a background process and/or upon an active slice retrieval sequence.

At step 168, the DS processing determines a DS storage unit associated with the DSN memory error. The storage set comprises the DS units assigned as the storage locations for the n pillars of the vault. Such a determination may be based on one or more of a vault lookup, a command, a predetermination, and the virtual DSN address to physical location table. At step 170 The DS processing determines the DS unit pillar with the DSN memory error based on one or more of a vault lookup, a command, a history record, a previous measurement, and a real time measurement.

At step 172, the DS processing retrieves EC data slices from one or more of the DS units by sending a retrieval command with slice names to the read DS units and receiving retrieved slices. In an example, the DS processing sends the retrieval command(s) all at once to at least a read threshold number of DS units of the DS storage set. Note that the subsequent rebuilding may rebuild more than one pillar based on utilization of network bandwidth once to receive slices. In an instance, each rebuild for each pillar need not re-retrieve all the slices of the storage set each time.

At step 174, the DS processing determines all of the DS unit pillars with DSN memory error(s) based on one or more of, but not limited to the retrieved slices, a vault lookup, a command, a history record, a previous measurement, and a real time measurement. For example, the DS processing determines that DS unit pillar 3 is in error when no slice was received from DS unit pillar 3. At step 176, the DS processing recreates the data object from the retrieved slices by de-slicing and decoding at least a read threshold k of the slices in accordance with an error coded dispersal storage function. At step 178, the DS processing recreates slices from the recreated data object in accordance with the error coded dispersal storage function.

The method continues with step 180 where the DS processing sends the recreated slices and slice names to the DS unit pillars with the DS memory error(s) with a store command to store the slices therein. In an example, the DS processing sends the slices to the DS unit(s) where the DSN memory error was detected. In another example, the DS processing sends the slices to the DS unit(s) where the DSN memory error was detected and at least one other DS unit of the DS unit storage set. Note that the DS processing sends the slices to the DS units one pillar at a time or all at once.

Figure 11:
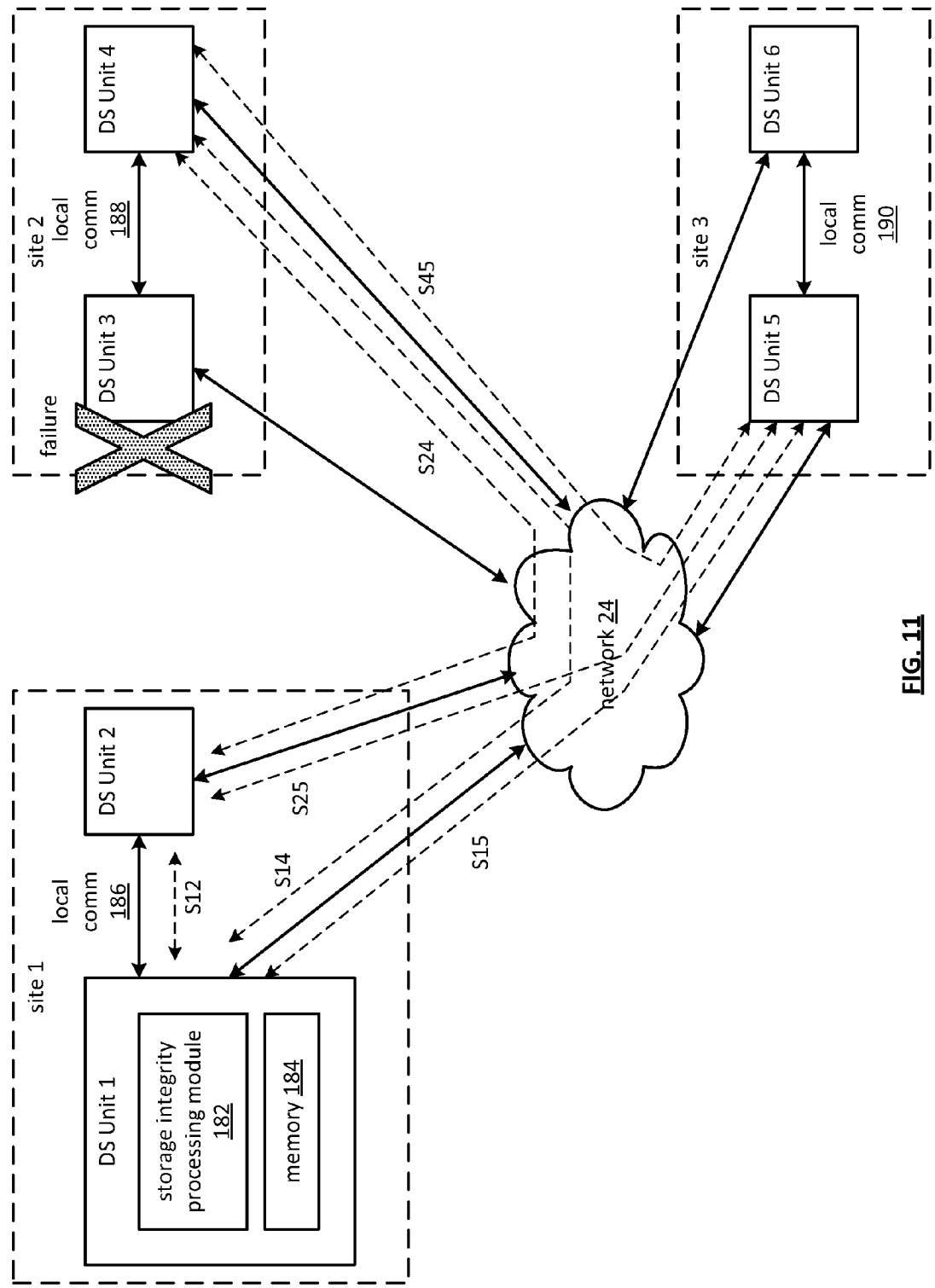
FIG. 11 is a schematic block diagram of another embodiment of a computing system in accordance with the invention.

FIG. 11 is a schematic block diagram of another embodiment of a computing system. As illustrated, the system includes a plurality of DS units 1-6 where DS units 1 and 2 are implemented at site 1, DS units 3 and 4 are implemented at site 2, and DS units 5 and 6 are implemented at site 3. As illustrated, DS unit 1 includes a storage integrity processing module 182 and a memory 184. In addition, DS units 2-6 may include the storage integrity processing module 182 and the memory 184. The storage integrity processing module 182 includes functionality of the storage integrity processing unit enabling the DS unit to function to rebuild EC data slices. The DS units 1-6 are operably coupled by local communications 186-190 (e.g., a local area network) when they are at the same site and by a network 24 (e.g., a wide area network) when they are not at the same site.

The storage integrity processing module 182 of the DS storage units 1-6 is capable of reconstructing a data segment, based on receiving recovered slices from at least some of the other DS storage units in a centralized fashion or each DS storage unit may sequentially compute a portion of the information to produce a reconstructed slice when the minimum number of good pillar slices has been included. In an example, the system has a pillar with n=6 and a read threshold k=4.

The DS units 1-6 communicate with each other to establish shared secrets by pairs of DS units (e.g., a shared secret between each combination of two DS units). The shared secret is a number generated randomly by either of the DS units of the pair. The shared secret number size may include any number of bytes. In an example of operation, DS unit 1 communicates with DS unit 5 to establish a shared secret S15 between them. Next, DS unit 5 generates a random number F4A7 and sends the number to DS unit 1 as a proposed shared secret. Next, DS unit 1 accepts the proposal and sends a confirmation message to DS unit 5 that F4A7 is their shared secret.

Note that shared secret may be encrypted such that a stored representation of the shared secret is encrypted (e.g., with a public key for the DS unit). The DS unit may decrypt the stored shared secret utilizing a private key associated with the DS unit. In addition, the shared secret may be encrypted such that a transmitted representation of the shared secret is encrypted (e.g., with a public key for the receiving DS unit). The receiving DS unit may decrypt a received shared secret utilizing a private key associated with the receiving DS unit.

In an example, DS unit 1 and DS unit 5 establish shared secret S15, DS unit 1 and DS unit 4 establish shared secret S14, DS unit 1 and DS unit 2 establish shared secret S12, DS unit 2 and DS unit 5 establish shared secret S25, DS unit 2 and DS unit 4 establish shared secret S24, and DS unit 4 and DS unit 5 establish shared secret S45.

Any of the DS units 1-6 may detect a data slice error in memory and may initiate a rebuild sequence by sending a partial decode command to at least a read threshold number of other DS units of the storage set where the partial decode command includes the pillar number of the detected error. The other DS units determine the partial, obfuscate the partial to create an obfuscated partial, and send the obfuscated partial to the DS unit in response to receiving a partial decode command. The DS unit de-obfuscates each of the partials and recreates the data slice of the data slice error and re-stores the slice. Note that none of the DS units receive data slices from other DS units and the partials are sent over the local communication or network in an obfuscated format to provide improved security and confidentiality. The method is discussed in greater detail with reference to FIGS. 12-16.

In another example of operation, a data slice error at DS unit 3 is detected by the storage integrity processing module 182 of DS unit 3. The storage integrity processing module 182 identifies the slice names to recover to reconstruct the slice in error based on the slice name of the failed slice. The storage integrity processing module 182 of DS unit 3 sends a partial decode command to a read threshold number of the DS units of the storage set (e.g., to DS units 1, 2, 4, 5). In an instance, the partial decode command includes an identity of the third pillar as the pillar with the error and a list of the DS units that were sent the partial decode command set (e.g., to DS units 1, 2, 4, 5).

In the example, DS unit 1 retrieves the requested data slice from its memory 184 and performs a partial decode step followed by a partial encode to produce a partial result P3,1 for the first slice pillar based on knowing that it is the third pillar with the error. Note that the partial decode and partial encode steps involve finite field arithmetic for the error control scheme and will be discussed in greater detail with reference to FIGS. 13-16. Note that a fundamental principle is that any slice can be recreated via combining the partial results from the companion data slices of companion pillars.

In the example, DS unit 1 retrieves the shared secrets S12, S14, and S15 between DS unit 1 and the other DS units of the read threshold set (e.g., DS units 2, 4, 5). In the example, the DS unit 1 obfuscates the partial result P3,1 utilizing an exclusive OR (XOR) logical function with each of the shared secrets S12, S14, S15 to produce P3,1⊕S12⊕S14⊕S15. The DS unit 1 sends the obfuscated partial to the DS unit 3. The method to create the obfuscated partial is discussed in greater detail with reference to FIG. 13.

In the example, DS unit 2 retrieves the slice from its memory 184 and performs a partial decode step followed by a partial encode step to produce a partial result P3,2 for the second slice pillar based on knowing that it is the third pillar with the error. The DS unit 2 retrieves the shared secrets S12, S24, and S25 between DS unit 2 and the other DS units of the read threshold set (e.g., DS units 1, 4, 5). In the example, DS unit 2 obfuscates the partial result P3,2 utilizing an exclusive OR (XOR) logical function with each of the shared secrets S12, S24, S25 to produce P3,2⊕S12⊕S24⊕S25. The DS unit 2 sends the obfuscated partial to the DS unit 3. The method to create the obfuscated partial is discussed in greater detail with reference to FIG. 14.

In the example, DS unit 4 retrieves the slice from its memory 184 and performs a partial decode step followed by a partial encode step to produce a partial result P3,4 for the fourth slice pillar based on knowing that it is the third pillar with the error. In the example, DS unit 4 retrieves the shared secrets S14, S24, and S45 between DS unit 4 and the other DS units of the read threshold set (e.g., DS units 1, 2, 5). Next, the DS unit 4 obfuscates the partial result P3,4 utilizing an exclusive OR (XOR) logical function with each of the shared secrets S14, S24, S45 to produce P3,4⊕S14⊕S24⊕S45. The DS unit 4 sends the obfuscated partial to the DS unit 3. The method to create the obfuscated partial is discussed in greater detail with reference to FIG. 15.

In the example, DS unit 5 retrieves the slice from its memory 184 and performs a partial decode step followed by a partial encode step to produce a partial result P3,5 for the fifth slice pillar based on knowing that it is the third pillar with the error. Next, DS unit 5 retrieves the shared secrets S15, S25, and S45 between DS unit 5 and the other DS units of the read threshold set (e.g., DS units 1, 2, 4). In example, DS unit 5 obfuscates the partial result P3,5 utilizing an exclusive OR (XOR) logical function with each of the shared secrets S15, S25, S45 to produce P3,5⊕S15⊕S25⊕S45. The DS unit 5 sends the obfuscated partial to the DS unit 3. The method to create the obfuscated partial is discussed in greater detail with reference to FIG. 16.

In the example, DS unit 3 receives the obfuscated partials from DS units 1, 2, 4, and 5. The DS unit 3 utilizes an obfuscation decoder to produce the desired pillar three slice based on the received obfuscated partials. In an instance, the obfuscation decoder XORs the obfuscated partials with each other to produce the desired slice. Note that the XOR of the four obfuscated partials will cancel out the twelve shared secrets since there are two identical shared secrets (e.g., one pair) of the six permutations of DS unit pairs amongst the four DS units. In an instance, the recreated slice of pillar three can be written as:

$$= P3,1 \oplus S12 \oplus S14 \oplus S15 \oplus P3,2 \oplus S12 \oplus S24 \oplus S25 \oplus P3,$$
$$4 \oplus S14 \oplus S24 \oplus S45 \oplus P3,5 \oplus S15 \oplus S25 \oplus S45$$
$$= P3,1 \oplus P3,2 \oplus P3,4 \oplus P3,$$
$$5 \oplus S12 \oplus S12 \oplus S14 \oplus S14 \oplus S15 \oplus S15 \oplus S24 \oplus$$
$$S24 \oplus S25 \oplus S25 \oplus S45 \oplus S45$$
$$= P3,1 \oplus P3,2 \oplus P3,4 \oplus P3,5 = \text{Slice 3}$$

Next, DS unit 3 stores the re-created pillar three slice in memory 184 thus completing rebuilding sequence to correct the slice failure.

Figure 12:
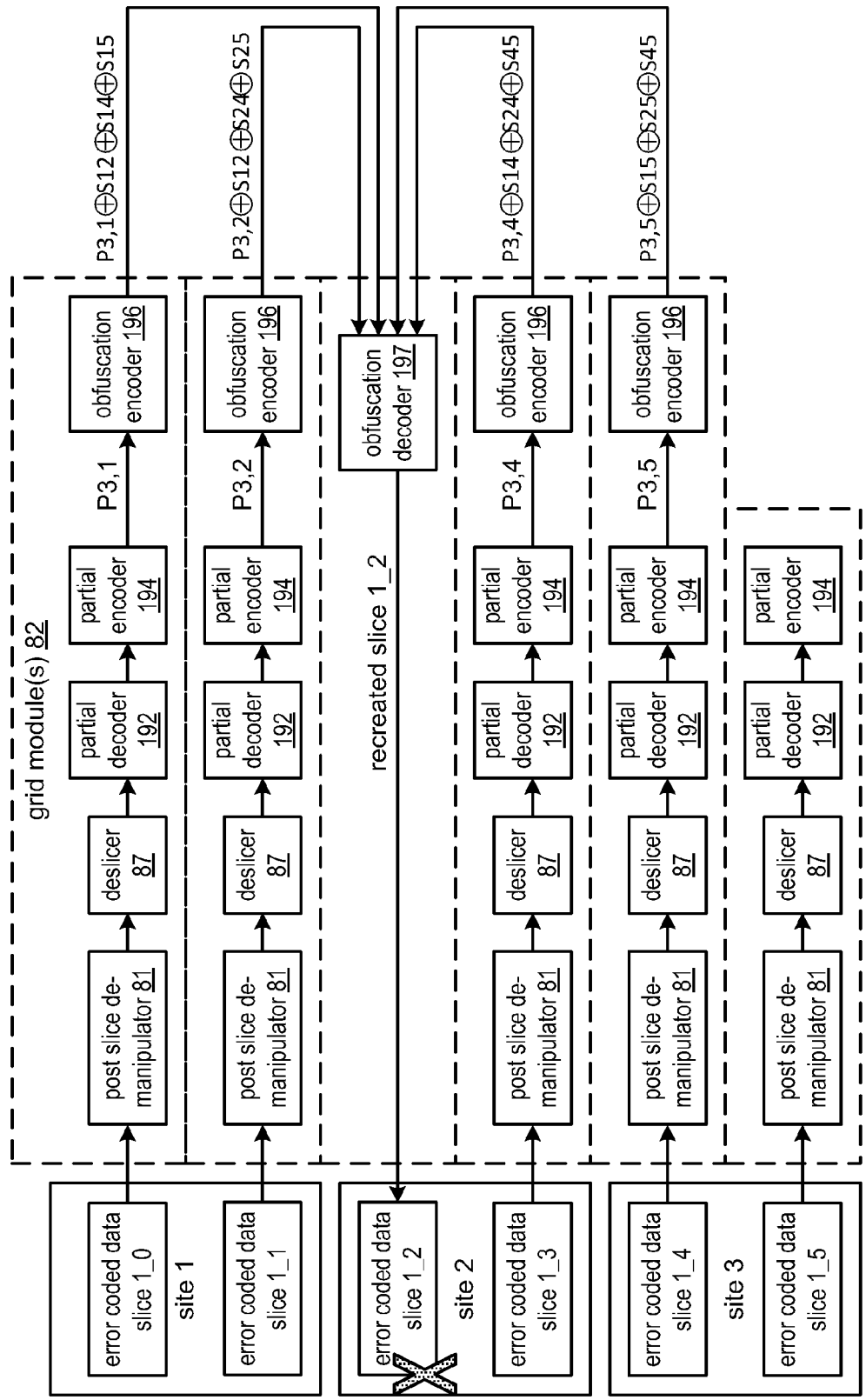
FIG. 12 is a schematic block diagram of an embodiment of a plurality of grid modules in accordance with the invention.

FIG. 12 is a schematic block diagram of an embodiment of a plurality of grid modules 82. As illustrated, grid module 82 includes a post-slice de-manipulator 81, a de-slicer 87, a partial decoder 192, a partial encoder 194, an obfuscation encoder 196, and an obfuscation decoder 197. A single grid module 82 may perform tasks on every pillar (e.g., all the DS units for this storage set) or the grid module 82 may perform the tasks on one pillar. In an example, the post-slice de-manipulator 81 performs a de-manipulation (e.g., CRC) on the good EC data slice before sending the slice to the de-slicer 87. The de-slicer 87 de-slices the slice to create its portion of the encoded data segment. In an instance, the de-slicer may be null. The partial decoder for 92 performs a decode function on the portion of the encoded data segment to produce a partially decoded portion of the data segment. The partial encoder 194 encodes the partially decoded portion of the data segment to produce a partially encoded portion of the data segment for this pillar.

In an example, slice 1_2 is in error at site 2. The grid module 82 processes slices 1_0, 1_1, 1_3, and 1_4, to create corresponding partials P3,1, P3,2, P3,4, and P3,5 which are obfuscated by an XOR with each of the stored shared secrets for the pillars in the retrieval sequence as discussed previously. The grid module 82 at site 2 may utilize an obfuscation decoder 197 on the obfuscated partials with finite field arithmetic to produce and locally store the desired reconstructed slice 1_2. The arithmetic will be discussed in greater detail with reference to FIGS. 13-16.

Figure 13:
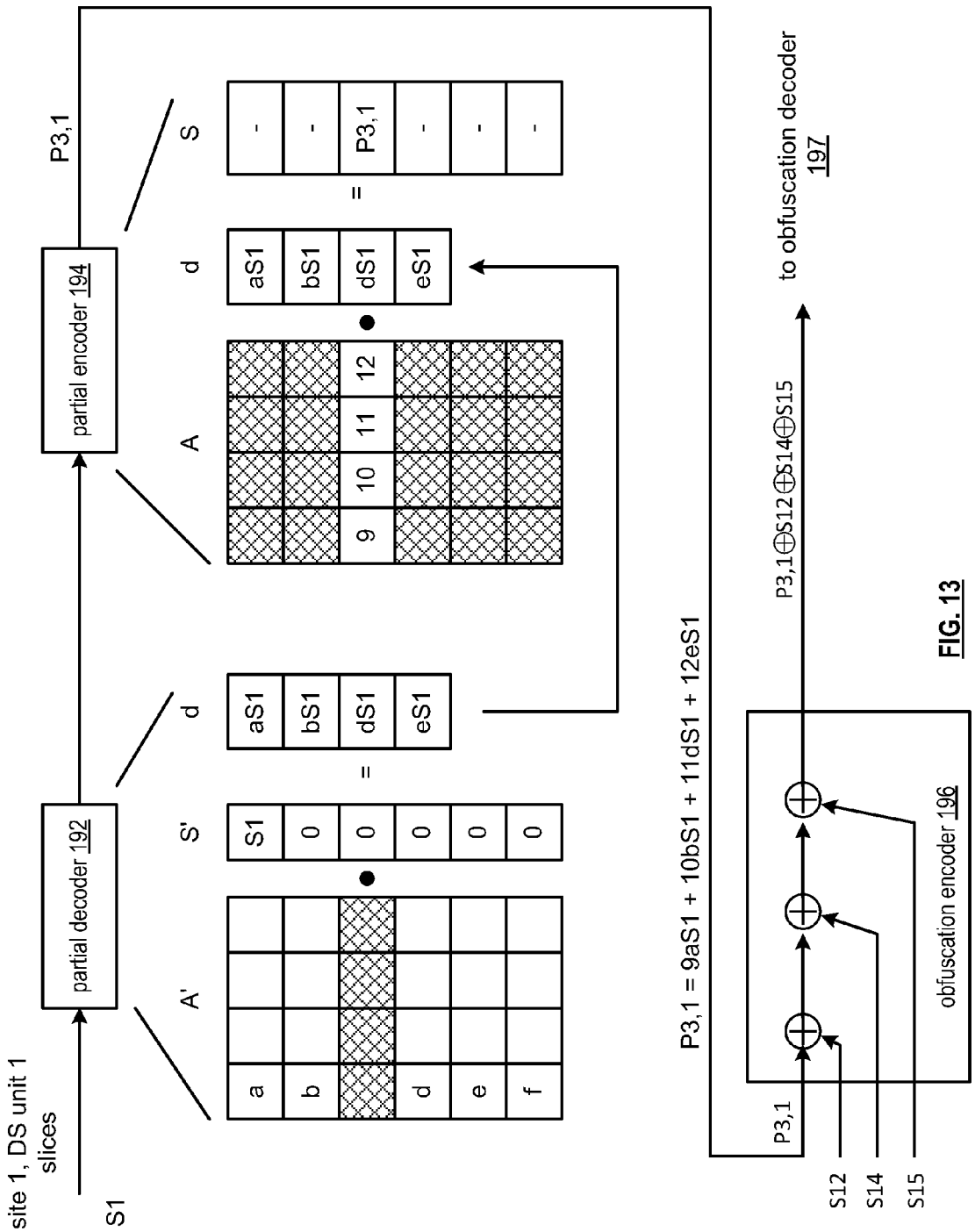
FIG. 13 is a schematic block diagram of another embodiment of a grid module in accordance with the invention.

FIG. 13 is a schematic block diagram of another embodiment of a grid module. As illustrated, the grid module includes a partial decoder 192, a partial encoder 194, and an obfuscation encoder 196. Together, they transform a known good slice into an obfuscated partial result that is later combined with other such partial results to determine a particular missing slice from the same data segment. In an example, FIGS. 13-16 illustrate the sequential steps to reconstruct a failed pillar 3 slice. In the example, the error control approach utilizes six pillars and requires at least four good pillars to reconstruct a missing slice (e.g., a 6/4 system). The example will illustrate utilizing pillars 1, 2, 4, and 5 to reconstruct the missing pillar 3 slice. The high level approach starts with each of the four encoder/decoder pairs creating their obfuscated partial result.

The partial decoder 192 matrix multiples an incoming good pillar 1 slice S1 from DS unit 1 at site 1 times a matrix A' where the number of rows equals the number of pillars and the number of columns equals the minimum number of required pillars for decoding. The first column is populated with random numbers a, b, d, e, and f. In an instance, these numbers are be different for in the matrix A' of the other pillars. Note that there is no need for a number c in the third row since that is the missing pillar row, nor the last row (f) since only four of the six pillars are required for reconstruction. The result is a vector d=aS1, bS1, dS1, e S1.

The partial encoder 194 matrix multiples the vector d times a matrix A where the number of rows equals the number of pillars and the number of columns equals the minimum number of required pillars for decoding. All the rows are blanked out except for row 3 which is populated with entries 9, 10, 11, 12 representing the entry numbers of the A matrix. These same numbers will be used in all the other partial encoders for the other pillars. The partial encoder produces the partial result for missing pillar 3, good pillar 1 as P3,1=9aS1+10bS1+11dS1+12eS1.

The obfuscation encoder 196 performs the XOR function of P3,1 with each of the shared secrets S12, S14, ad S15 to produce the obfuscated partial P3,1⊕S12⊕S14⊕S15 for slice 1. The grid module 82 sends the obfuscated partial to DS unit 3.

Figure 14:
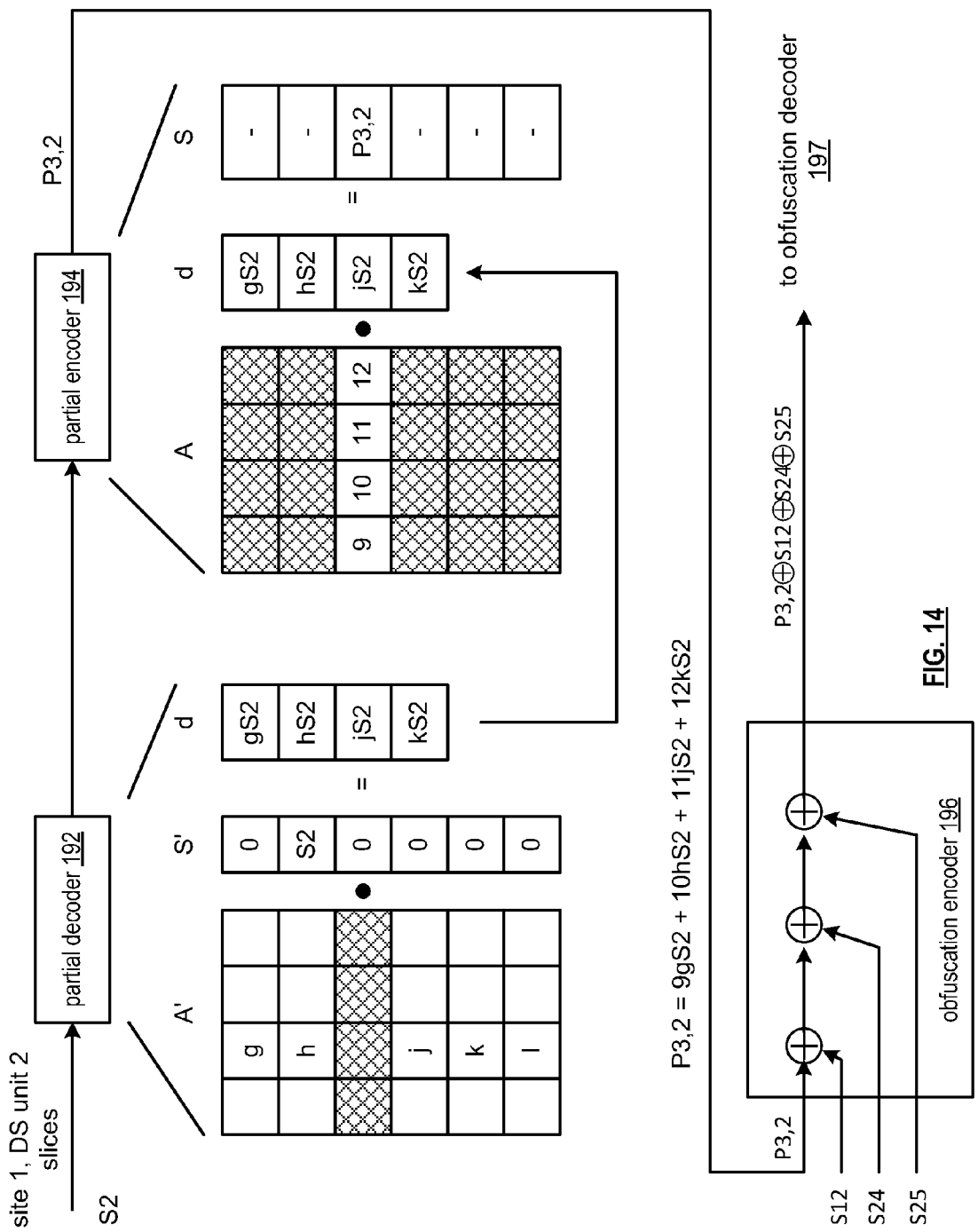
FIG. 14 is a schematic block diagram of another embodiment of a grid module in accordance with the invention.

FIG. 14 is a schematic block diagram of another embodiment of a grid module. As illustrated, the grid module includes a partial decoder 192, a partial encoder 194, and an obfuscation encoder 196. Together, they transform a known good slice into an obfuscated partial result that is later combined with other such partial results to determine a particular missing slice from the same data segment.

In the continuing example, DS unit 2 partial decoder 192 matrix multiples the incoming good pillar 2 slice S2 from DS unit 2 at site 1 times a matrix A' where the number of rows equals the number of pillars and the number of columns equals the minimum number of required pillars for decoding. In an instance, the second column is populated with random numbers g, h, j, k, and l. Note that these numbers are different for in the matrix A' of the other pillars. Note that there is no need for a number i in the third row since that is the missing pillar row, nor the last row (l) since only four of the six pillars are required for reconstruction. The result is a vector d=gS2, hS2, jS2, kS2.

The partial encoder 194 matrix multiples the vector d times a matrix A where the number of rows equals the number of pillars and the number of columns equals the minimum number of required pillars for decoding. Note that the rows are blanked out except for row 3 which is populated with entries 9, 10, 11, 12 representing the entry numbers of the A matrix. These same numbers will be used in all the other partial encoders for the other pillars. The partial encoder 194 produces the partial result for missing pillar 3, good pillar 2 as P3,2=9gS2+10hS2+11jS2+12kS2.

The obfuscation encoder 196 performs the XOR function of P3,2 with each of the shared secrets S12, S24, ad S25 to produce the obfuscated partial P3,2⊕S12⊕S24⊕S25 for slice 2. The grid module 82 sends the obfuscated partial to DS unit 3.

Figure 15:
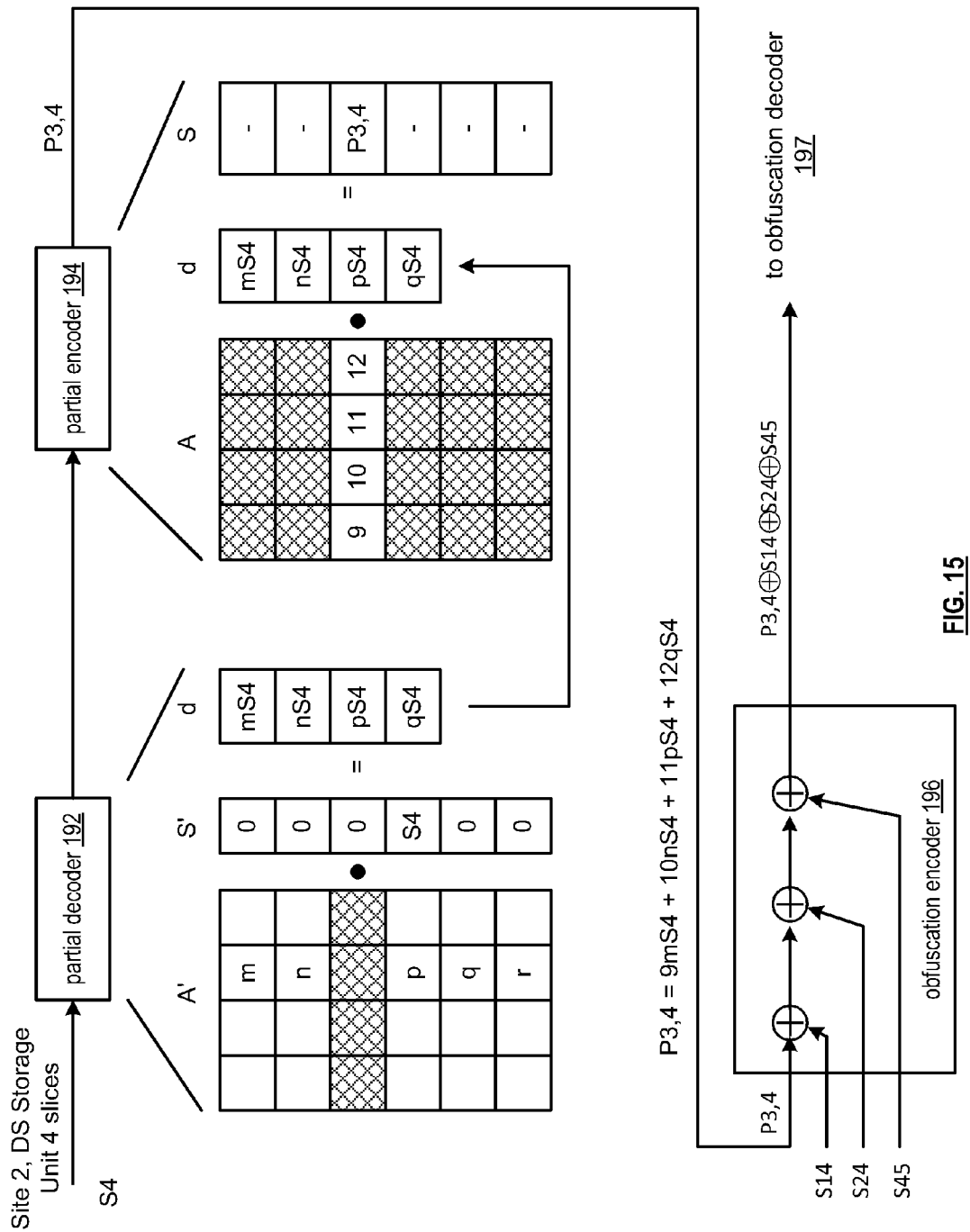
FIG. 15 is a schematic block diagram of another embodiment of a grid module in accordance with the invention.

FIG. 15 is a schematic block diagram of another embodiment of a grid module. As illustrated, the grid module includes a partial decoder 192, a partial encoder 194, and an obfuscation encoder 196. Together, they transform a known good slice into an obfuscated partial result that is later combined with other such partial results to determine a particular missing slice from the same data segment.

The example continues where DS unit 4 partial decoder 192 matrix multiples the incoming good pillar 4 slice S4 from DS unit 4 at site 2 times a matrix A' where the number of rows equals the number of pillars and the number of columns equals the minimum number of required pillars for decoding. Note that the third column is populated with random numbers m, n, p, q, and r. An instance, these numbers will be different for in the matrix A' of the other pillars. Note that there is no need for a number in the third row since that is the missing pillar row, nor the last row (r) since only four of the six pillars are required for reconstruction. The result is a vector d=mS4, nS4, pS4, qS4.

The partial encoder 194 matrix multiples the vector d times a matrix A where the number of rows equals the number of pillars and the number of columns equals the minimum number of required pillars for decoding. All the rows are blanked out except for row 3 which is populated with entries 9, 10, 11, 12 representing the entry numbers of the A matrix. Note that these same numbers will be used in all the other partial encoders for the other pillars. The partial encoder produces the partial result for missing pillar 3, good pillar 4 as P3,4=9mS4+10 nS4+11pS4+12qS4.

The obfuscation encoder 196 performs the XOR function of P3,4 with each of the shared secrets S14, S24, ad S45 to produce the obfuscated partial P3,4⊕S14⊕S24⊕S45 for slice 4. The grid module 82 sends the obfuscated partial to DS unit 3.

Figure 16:
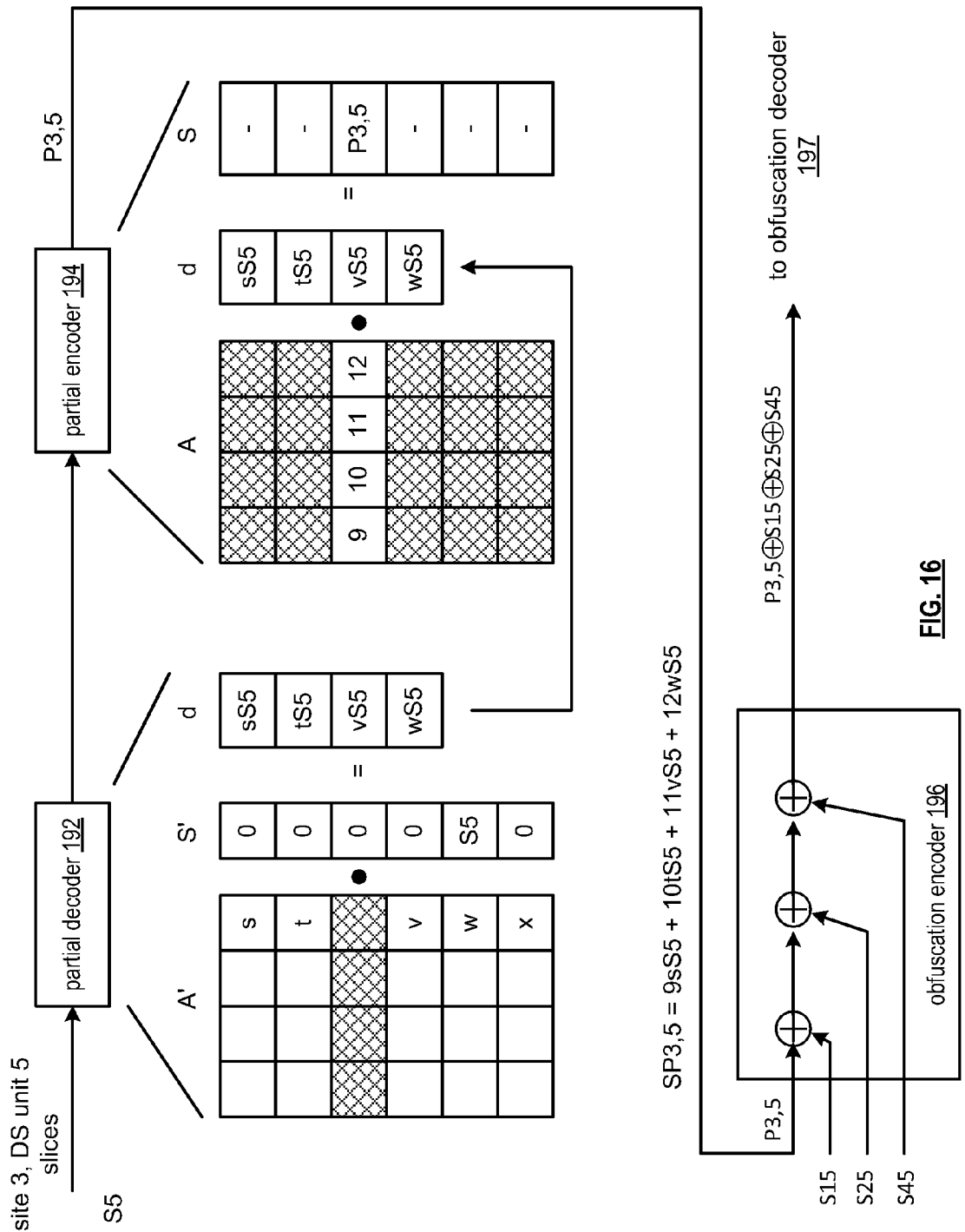
FIG. 16 is a schematic block diagram of another embodiment of a grid module in accordance with the invention.

FIG. 16 is a schematic block diagram of another embodiment of a grid module. As illustrated, the grid module 82 a partial decoder 192, a partial encoder 194, and an obfuscation encoder 196. Together, they transform a known good slice into an obfuscated partial result that is later combined with other such partial results to determine a particular missing slice from the same data segment.

In the continuing example, DS unit 5 partial decoder 192 matrix multiples the incoming good pillar 5 slice S5 from DS unit 5 at site 3 times a matrix A' where the number of rows equals the number of pillars and the number of columns equals the minimum number of required pillars for decoding. Note that the fourth column is populated with random numbers s, t, v, w, and x. In an instance, these numbers will be different for in the matrix A' of the other pillars. Note that there is no need for a number u in the third row since that is the missing pillar row, nor the last row (x) since only four of the six pillars are required for reconstruction. The result is a vector d=sS5, tS5, vS5, wS5.

Next, partial encoder 194 matrix multiples the vector d times a matrix A where the number of rows equals the number of pillars and the number of columns equals the minimum number of required pillars for decoding. Note that all the rows are blanked out except for row 3 which is populated with entries 9, 10, 11, 12 representing the entry numbers of the A matrix. In an instance, these same numbers will be used in all the other partial encoders for the other pillars. Next, partial encoder 94 produces the partial result for missing pillar 3, good pillar 5 as P3,5=9sS5+10tS5+11vS5+12wS5.

The obfuscation encoder 196 performs the XOR function of P3,5 with each of the shared secrets S15, S25, ad S45 to produce the obfuscated partial P3,5⊕S15⊕S25⊕S45 for slice 5. The grid module 82 sends the obfuscated partial to DS unit 3 where the obfuscation decoder 197 decodes the partials to produce the re-created slice 1_2. Next, DS unit 3 stores the re-created slice in the memory 184 to substantially complete the rebuilding process described in example.

Figure 17:
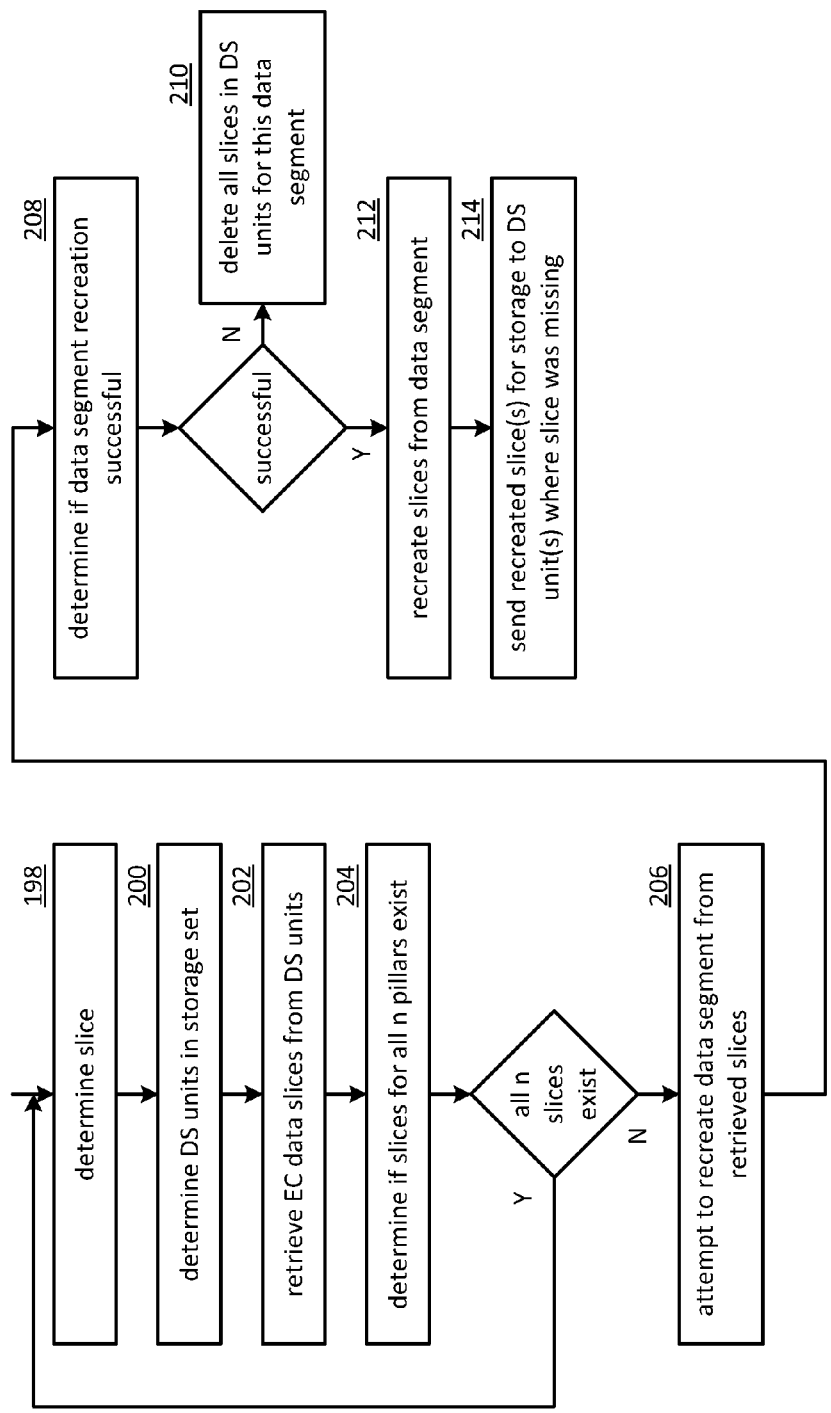
FIG. 17 is a flowchart illustrating an example of optimizing memory usage in accordance with the invention.

FIG. 17 is a flowchart illustrating an example of optimizing memory usage by a storage integrity processing unit. The method begins with step 198 where a DS processing of (e.g., one of the storage integrity processing unit, the DS managing unit, the DS processing unit, the DS unit, and/or the user device) determines a slice to investigate for deletion. Such a determination may be based on one or more of a random slice on a DS unit, a random slice in the computing system, a first slice of the first vault, a last slice that was investigated, an error message, an error detection, a priority indicator, a security indicator, a predetermination, and a command.

At step 200, the DS processing determines DS storage units of a DS storage set associated with the slice. Note that the storage set comprises DS units assigned as the storage locations for the n pillars of a vault. Such a determination may be based on one or more of a vault lookup, a command, a predetermination, and the virtual DSN address to physical location table. At step 202, the DS processing retrieves EC data slices from all n (e.g., pillar width) of the DS units by sending a retrieval command to the DS units of additional storage set and by receiving retrieved slices.

The method continues with step 204 where the DS processing determines if slices for all n pillars were received by counting them and/or matching slice names to pillar numbers. The method branches back to step 198 (e.g., to go to the next slice) when the DS processing determines that slices for all n pillars were received. The method continues to step 206 when the DS processing determines that the slices for all n pillars were not received. At step 206, the DS processing attempts to recreate the data segment from the retrieved slices decoding at least a read threshold k of the slices in accordance with an error coding dispersal storage function. Next, at step 208, the DS processing determines if the data segment recreation was successful based on a read threshold number of retrieved slices. For example, the DS processing determines an unsuccessful data object recreation when at least one data segment does not have at least a read threshold number of retrieved slices to recreate the data segment. The method branches to step two into when the DS processing determines that the data segment recreation was successful. The method continues to step 210 where the DS processing determines that the data segment recreation was not successful. At step 210, the DS processing sends a delete command to the DS units for this data segment to delete all the slice names associated with the data segment. Note that the method provides an improvement to free up memory when partial data exists that is not recoverable.

At step 212, the DS processing recreates slices from the recreated data segments of the data object in accordance with the error coding dispersal storage function when the DS processing determines that all the data segments were successfully recreated for the data object. At step 214, the DS processing sends the recreated slices and slice names to the DS unit storage set with a store command to store the slices. In an example, the DS processing sends the slices to the DS unit(s) where the slices were missing. In another example, the DS processing sends the slices to the DS unit(s) where the slices were missing and at least one other DS unit of the DS unit storage set. In an instance, the DS processing sends the slices to the DS units one pillar at a time. In another instance, the DS processing sends the slices to the DS units all at once as a batch.

Figure 18:
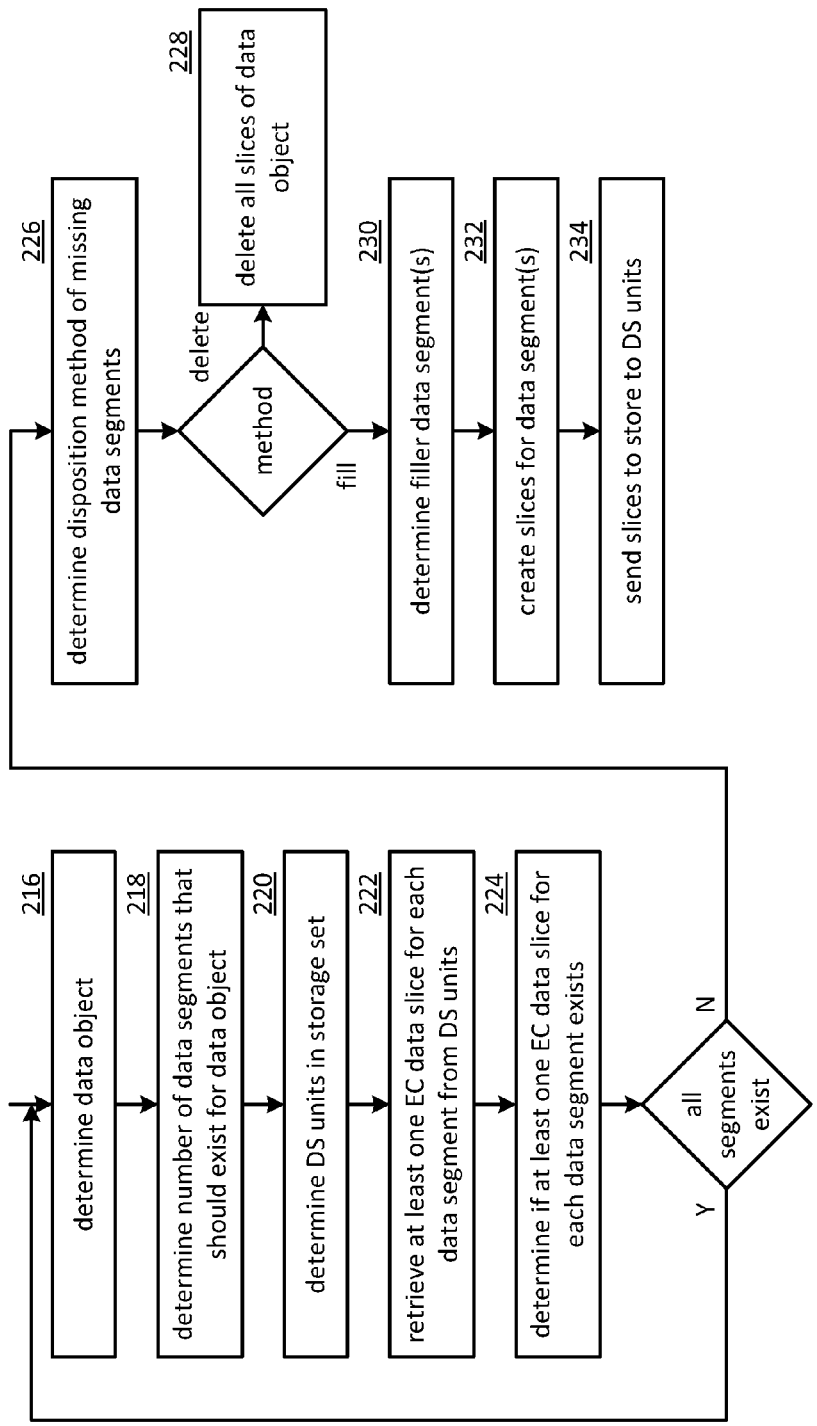
FIG. 18 is a flowchart illustrating another example of optimizing memory usage in accordance with the invention.

FIG. 18 is a flowchart illustrating another example of optimizing memory usage. The method begins at step 216 where a DS processing (e.g., of one of the storage integrity processing unit, the DS managing unit, the DS processing unit, the DS unit, and/or the user device) determines a data object to investigate for deletion. Such a determination may be based on one or more of a random data object on a DS unit, a data object in the computing system, a first data object of the first vault, a last data object that was investigated, an error message, an error detection, a priority indicator, a security indicator, a predetermination, and a command.

At step 218, the DS processing determines a number of data segments that should exist based on vault information for data object. At step 220, the DS processing determines DS storage units of the DS storage set associated with the data object. Such a determination may be based on one or more of a vault lookup, a command, a predetermination, and a virtual DSN address to physical location table lookup. At step 222, the DS processing retrieves at least one EC data slices from at least one of the n pillars of the DS units by sending a retrieval command to the DS units and by receiving retrieved slices.

The method continues at step 224 where the DS processing determines whether at least one EC data slice from at least one of the n pillars of the DS units for each data segment were received by counting them and/or matching slice names, data segment IDs, to pillar numbers. Note that the segments may all be present when at least one slice is retrieved from each data segment of the data object. The method branches back to step 216 (e.g., to go to the next data object) when the DS processing determines that at least one slices for all the data segments were received. The method continues to step 226 when the DS processing determines that least one EC data slice from at least one of the n pillars of the DS units for each data segment were not received.

At step 226, the DS processing determines a disposition method of missing data segments. Such a method includes deleting the data object or filling missing data segment(s). Such a determination may be based on one or more of a vault lookup, a command, a predetermination, a priority indicator, a security indicator, and a data object type. For example, the DS processing determines to delete the data object when the data type is a software program backup that cannot tolerate errors. In another example, the DS processing determines to fill the missing data segment(s) of a data object when the data type is a video file that can tolerate errors. The method branches to step 230 when the DS processing determines the disposition method of missing data segments to be filler data segments. The method continues to step 228 when the DS processing determines the disposition method of missing data segments to be delete the data object. At step 228, the DS processing sends a delete slice command to the DS units that have slice names associated with the data object. In an instance, the DS processing deletes the data object name from an associated vault. In another instance, DS processing deletes a directory reference of the data object name from a directory.

At step 230, the DS processing determines filler data segment(s) for missing segment(s) of the data object. For example, the filler may include all zeroes, all ones, a pattern, a predetermined number, a received number, a backup data segment, or a hash of data (e.g., the data segment ID, the data object ID, the remaining data object, etc.). Such a determination may be based on one or more of a vault lookup, a command, a predetermination, a security indicator, a priority indicator, and a data type. At step 232, the DS processing creates slices from the filler data segment(s) of the data object in accordance with an error coding dispersal storage function. At step 234, the DS processing sends the slices and associated slice names to the DS unit storage set with a store command to store the slices there in. In an example, the DS processing sends the slices to the DS unit(s) where the data segment(s) were missing. In another example, the DS processing sends the slices to the DS unit(s) where the data segment(s) were missing and at least one other DS unit of the DS unit storage set. In an instance, the DS processing sends the slices to the DS units one pillar at a time. In another instance, the DS processing sends the slices to the DS units all at once.

Figure 19:
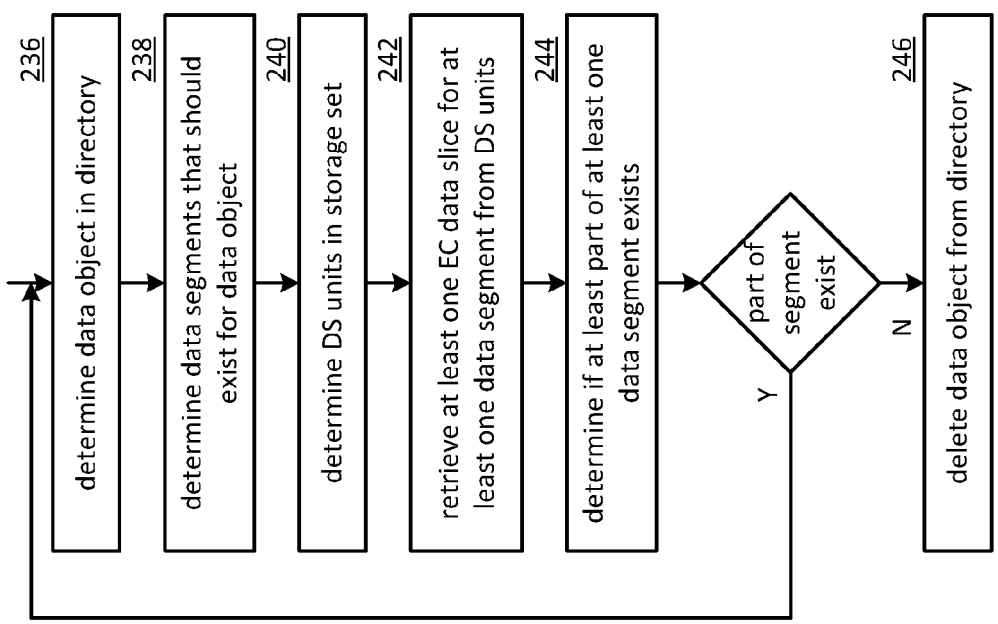
FIG. 19 is a flowchart illustrating another example of optimizing memory usage in accordance with the invention.

FIG. 19 is a flowchart illustrating another example of optimizing memory usage. The method begins with step 236 where a DS processing (e.g., of one of the storage integrity processing unit, the DS managing unit, the DS processing unit, the DS unit, and/or the user device) determines a data object name in the directory to investigate for deletion. Such a determination may be based on one or more of a random data object on a DS unit, a data object in the computing system, a first data object of the first vault, a last data object that was investigated, an error message, an error detection, a priority indicator, a security indicator, a predetermination, and a command.

At step 238, the DS processing determines the data segments that should exist based on vault information for data object. At step 240, the DS processing determines DS storage units of the DS storage set associated with the data object. Such a determination may be based on one or more of a vault lookup, a command, a predetermination, and the virtual DSN address to physical location table. At step 242, the DS processing retrieves at least one EC data slice from at least one data segment of the data object from the DS units by sending a retrieval command with slice names to the DS units and by receiving retrieved slices.

The method continues at step 244 where the DS processing determines whether at least one EC data slice from at least one of the n pillars of the DS units of at least one data segment of the data object was received by counting them and/or matching slice names, data segment IDs, to pillar numbers. Note that the data object may be present when at least one slice is retrieved from at least one data segment of the data object. The method branches back to step 236 where the DS processing determines the data object in the directory (e.g., to go to the next data object) when the DS processing determines that at least one slice exists for the data. The method continues to step 246 when the DS processing determines that least one EC data slice of the data object was not received. At step 246, the DS processing deletes the data object name from the directory since no slices exist for the data object.

Figure 20:
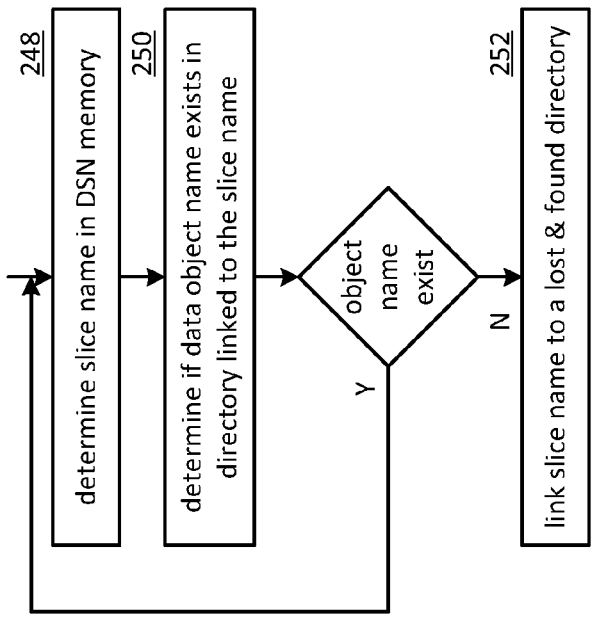
FIG. 20 is a flowchart illustrating another example of optimizing memory usage in accordance with the invention.

FIG. 20 is a flowchart illustrating another example of optimizing memory usage. The method begins at step 248 where a DS processing (e.g., of one of the storage integrity processing unit, the DS managing unit, the DS processing unit, the DS unit, and/or the user device) determines a slice name in DSN memory to investigate for deletion. Such a determination may be based on one or more of a random slice on a DS unit, a random slice in the computing system, the first slice of the first vault, the last slice that was investigated, an error message, an error detection, a priority indicator, a security indicator, a predetermination, and a command.

The method continues at step 250 where the DS processing determines if a data object name exists in a directory linked to the slice name. Such a determination may be based on converting the slice name into a source name and checking the directory vault for the source name. The DS processing determines the slice name is linked to a data object name in the directory when the source name is found. The method branches back to step 248 (e.g., to go to another slice name) when the DS processing determines that the data object name exists in a directory linked to the slice name. The method continues to step 252 when the DS processing determines that the data object name does not exist in a directory linked to the slice name. At step 252, the DS processing unit links the slice name to a lost and found directory for potential subsequent processing. Additionally, the DS processing may delete the slice (e.g., a lost slice). In another instance, the DS processing links the slice to a different data object name in the directory (e.g., a found slice).

Figure 21A:
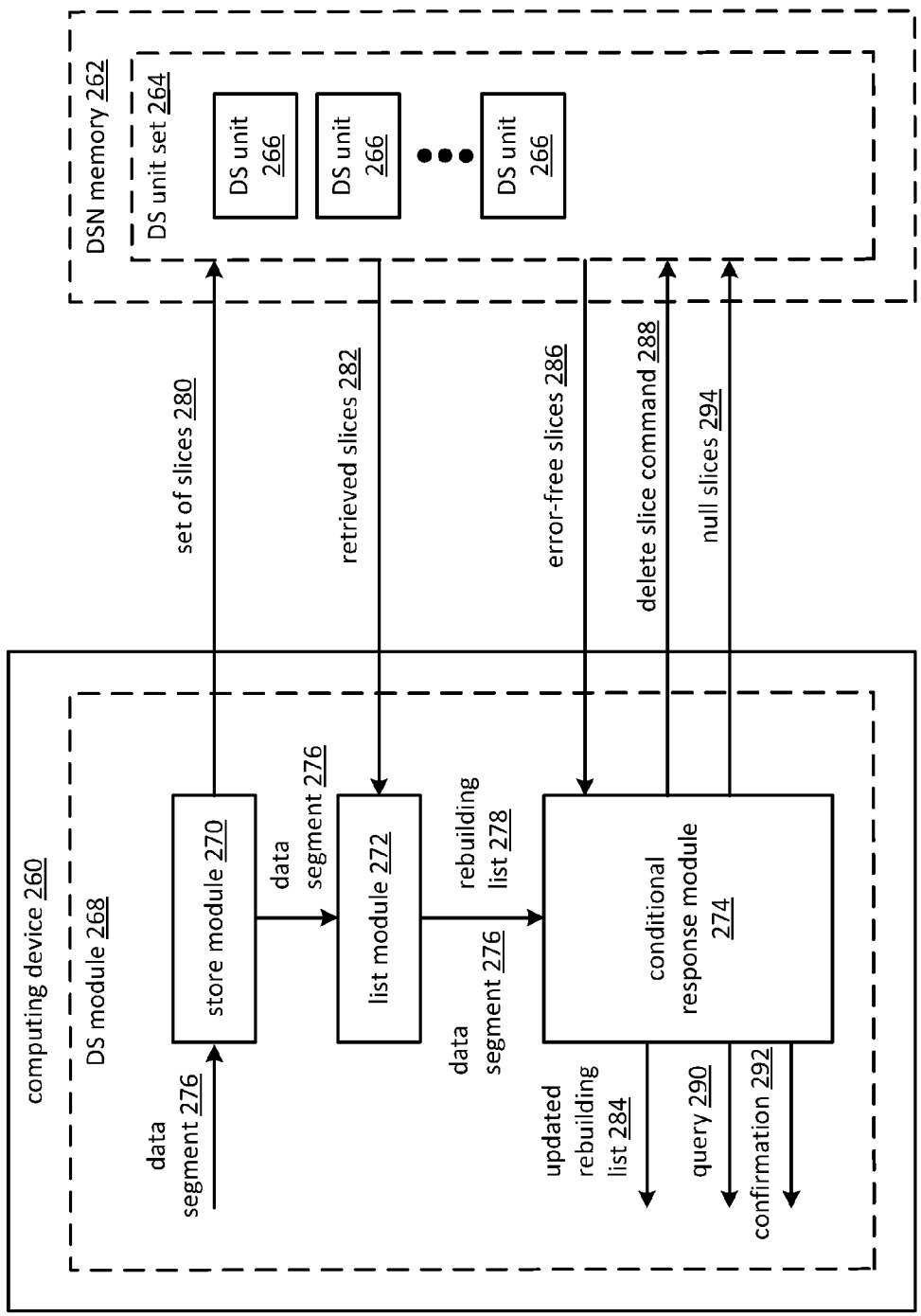
FIG. 21A is a schematic block diagram of an embodiment of a dispersed storage network (DSN) in accordance with the invention.

FIG. 21A is a schematic block diagram of an embodiment of a dispersed storage network (DSN) that includes a computing device 260 and a dispersed storage network (DSN) memory 262. The DSN memory 262 may be implemented utilizing one or more of a distributed storage and task network (DSTN), a DSTN module, a plurality of storage nodes, one or more dispersed storage (DS) unit sets 264, and a plurality of distributed storage (DS) units 266. Each DS unit 266 may be implemented utilizing at least one of a storage server, a storage unit, a storage module, a memory device, a memory, a distributed storage and task (DST) execution unit, a user device, a DST processing unit, and a DST processing module. The computing device 260 may be implemented utilizing at least one of a server, a storage unit, a DSTN managing unit, a DSN managing unit, a DS unit 266, a storage server, a storage module, a DS processing unit, a DST execution unit, a user device, a DST processing unit, and a DST processing module. For example, computing device 260 is implemented as the DS processing unit. The computing device 260 includes a dispersed storage (DS) module 268. The DS module 268 includes a store module 270, a list module 272, and a conditional response module 274.

The system functions to store a data segment 276 in the DS unit set 264, add the data segment 276 to a rebuilding list 278, and remove the data segment 276 from the rebuilding list 278 in response to a condition. With regards to storing the data segment, the store module 270 stores a set of encoded data slices 280 in the DSN memory 262 (e.g., in a set of DS units 266 of a DS unit set 264). The data segment 276 is encoded using an error coding dispersal storage function to produce the set of encoded data slices 280. Next, the store module 270 outputs the set of encoded data slices 280 to the set of DS units 266.

With regards to adding the data segment 276 to the rebuilding list 278, the list module 272 adds the data segment 276 to the rebuilding list 278, where encoded data slices of data segments identified in the rebuilding list 278 are checked via a rebuilding process to detect errors and, when one of the encoded data slices has an error, the rebuilding process rebuilds the one of the encoded data slices. The adding includes identifying the data segment 276 to produce a segment identifier (ID) and appending the segment ID to the rebuilding list 278. The list module 272 may perform at least a portion of the rebuilding process. For example, the list module 272 may detect the errors by a series of detection steps. A first detection step includes the list module 272 issuing a pillar width number of encoded data slice retrieval commands to the set of DS units 266 with regards to the set of encoded data slices 280. A second detection step includes the list module 272 receiving one or more encoded data slices of the set of encoded data slices to produce one or more retrieved encoded data slices 282. A third detection step includes the list module 272 indicating that the one of the encoded data slices has the error when the one or more retrieved encoded data slices does not include the one of the encoded data slices.

With regards to removing the data segment 276 from the rebuilding list 278 in response to the condition, the conditional response module 274, in response to the condition, removes the data segment 276 from the rebuilding list 278 to produce an updated rebuilding list 284. The condition includes at least one of elapse of time, a user command (e.g., a user approves deletion, a change subscription level), a system administrator directive (e.g., an account expired, data age setting), and a passive expiration subscription. For example, the conditional response module 274 removes the data segment 276 from the rebuilding list 278 to produce the updated rebuilding list 284 when a time frame since initial storage of the set of slices 280 is greater than a time threshold. As another example, the conditional response module 274 removes the data segment 276 from the rebuilding list 278 to produce the updated rebuilding list 284 when receiving a user command that indicates deletion approval in response to a deletion approval query.

When the data segment 276 has been removed from the rebuilding list 278, the conditional response module 274 performs one of a primary sequence or an alternative sequence. When performing the primary sequence, the conditional response module 274 determines when the set of encoded data slices 280 includes a threshold number of error-free encoded data slices remaining in the DSN memory 262. The threshold number may include any number of encoded data slices equal to or greater than a decode threshold number, where the decode threshold number is a minimum number of encoded data slices required to decode the threshold number of error-free encoded data slices to reproduce the data segment 276. For example, the threshold number includes the decode threshold number. As another example, the threshold number includes a read threshold number. As yet another example, the threshold number includes a pillar width number.

The determining when the set of encoded data slices 280 includes the threshold number of error-free encoded data slices remaining in the DSN memory 262 includes a series of threshold checking steps. A first threshold checking step includes the conditional response module 274 issuing the pillar width number of encoded data slice retrieval commands to the set of DS units 266 with regards to the set of encoded data slices 280. A second threshold checking step includes the conditional response module 274 receiving one or more error-free encoded data slices of the set of encoded data slices 280 to produce one or more retrieved error-free encoded data slices 286. A third threshold checking step includes the conditional response module 274 indicating that the set of encoded data slices 280 includes the threshold number of error-free encoded data slices when a number of the one or more retrieved error-free encoded data slices 286 is greater than or equal to the threshold number.

When the set of encoded data slices 280 includes the threshold number of error-free encoded data slices remaining in the DSN memory 262, the conditional response module 274 further functions to perform a conditional response of a set of conditional responses. A first conditional response of the set of conditional responses includes the conditional response module 274 deleting the threshold number of error-free encoded data slices and deleting addressing information regarding the data segment. For example, the initial response module 274 issues delete slice commands 288 to the DSN memory 262 with regards to the threshold number of error-free encoded data slices. A second conditional response of the set of conditional responses includes the conditional response module 274 sending a query 290 regarding re-adding the data segment 276 to the rebuilding list 278. The conditional response module 274 updates the rebuilding list 278 in accordance with a query response. A third conditional response of the set of conditional responses includes the conditional response module 274 confirming non-rebuilding of encoded data slices of the set of encoded data slices 280. For example, the conditional response module 274 issues a confirmation 292.

A fourth conditional response of the set of conditional responses includes the conditional response module 274 detecting when less than the threshold number of encoded data slices are available for the data segment and when the less than the threshold number of encoded data slices are available for the data segment, deleting the less than the threshold number of encoded data slices and deleting the addressing information regarding the data segment. For example, the conditional response module 274 issues delete slice commands 288 to the DSN memory 262 with regards to the less than the threshold number of encoded data slices. A fifth conditional response of the set of conditional responses includes the conditional response module 274 detecting when less than the threshold number of encoded data slices are available for the data segment and when the less than the threshold number of encoded data slices are available for the data segment, replacing the data segment 276 with null data. For example, the conditional response module 274 generates a null data segment to include one of a predetermined pattern, a received number, a backup data segment, and a hash of one or more of a data object, a data segment identifier, and a data object identifier. Next, the conditional response module 274 encodes the null data segment using the error coding dispersal storage function to produce a set of null slices 294. The conditional response module 274 sends the set of null slices 294 to the DS unit set 264 for storage therein.

When performing the alternate sequence, the conditional response module 274 performs a series of alternate steps when the data segment 276 has been removed from the rebuilding list 278. In a first alternate step, the conditional response module 274 identifies other data segments of a plurality of data segments, where the plurality of data segments include the data segment 276 and corresponds to at least one data object. In a second alternate step, the conditional response module 274 determines whether at least some of the other data segments have been removed from the rebuilding list 278. When at least a predetermined number of other data segments have been removed from the rebuilding list, in a third alternate step the conditional response module 274 determines whether the at least the predetermined number of other data segments have at least a threshold number of encoded data slices available. When the at least the predetermined number of other data segments does not have at least the threshold number of encoded data slices available, in a fourth alternate step the conditional response module 274 deletes the at least one data object from the memory of the DSN (e.g., issuing delete slice commands 288 to the DSN memory 262 with regards to the at least one data object).

Figure 21B:
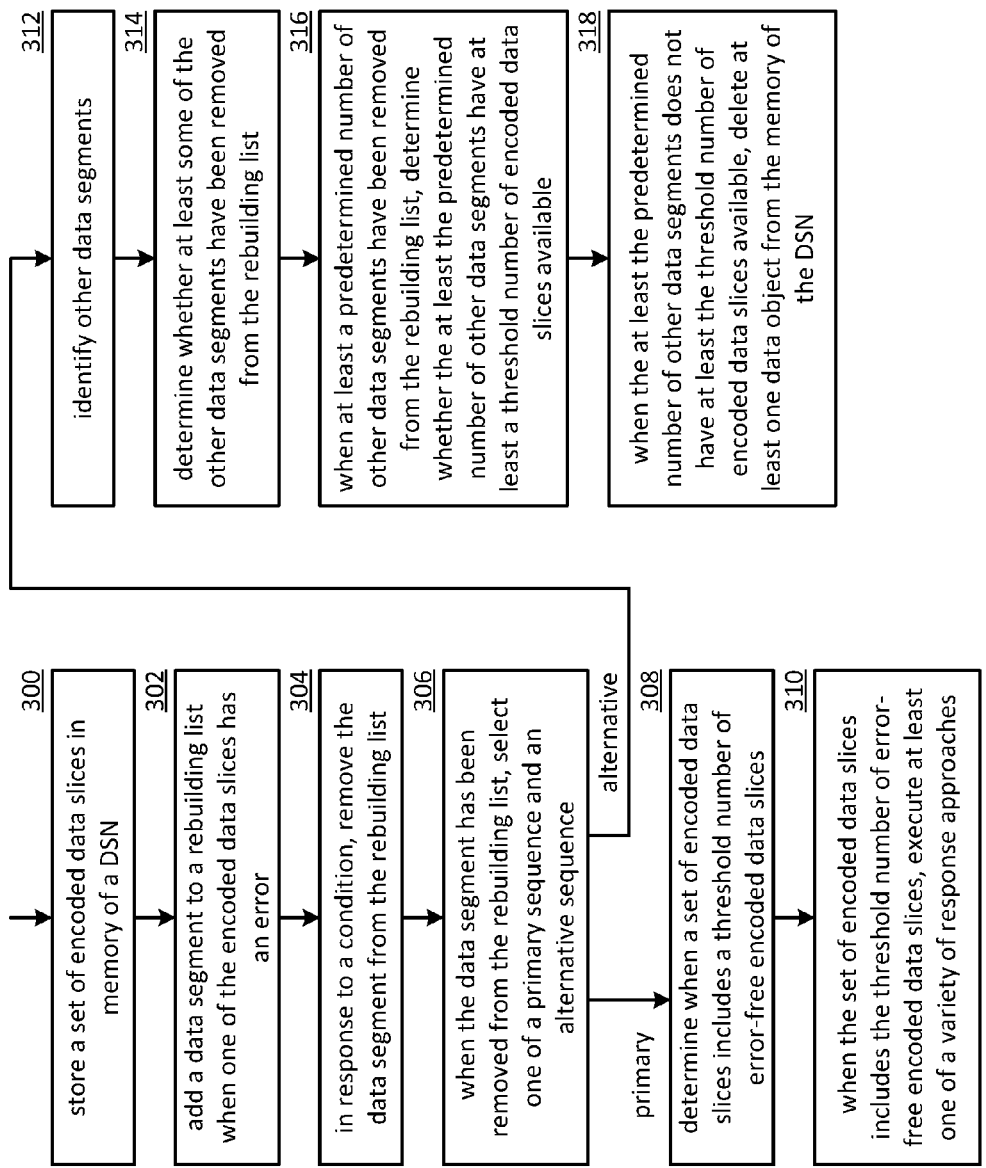
FIG. 21B is a flowchart illustrating an example of rebuilding a data segment in accordance with the invention.

FIG. 21B is a flowchart illustrating an example of rebuilding a data segment. The method begins at step 300 where a processing module (e.g., of a dispersed storage (DS) processing module within a dispersed storage network (DSN)) stores a set of encoded data slices in memory of the DSN, where a data segment is encoded using an error coding dispersal storage function to produce the set of encoded data slices. The method continues at step 302 to where the processing module adds the data segment to a rebuilding list (e.g., an identifier of the data segment is added to the rebuilding list), where encoded data slices of data segments identified in the rebuilding list are checked via a rebuilding process to detect errors and, when one of the encoded data slices has an error, the rebuilding process rebuilds the one of the encoded data slices. In response to a condition, the method continues at step 304 where the processing module removes the data segment from the rebuilding list. When data segment has been removed from the rebuilding list, the method continues at step 306 where the processing module selects one of a primary sequence and an alternative sequence. The selecting may be based on one or more of a query, a query response, a command, a request, a predetermination, a cost estimator, a performance requirement, a security requirement, a data type indicator, a data object identifier, and a list. The method branches to step 312 when the alternative sequence has been selected. The method continues to step 308 when the primary sequence has been selected.

When the data segment has been removed from the rebuilding list, the method continues at step 308 where the processing module determines when the set of encoded data slices includes a threshold number of error-free encoded data slices remaining in the memory of the DSN. When the set of encoded data slices includes the threshold number of error-free encoded data slices remaining in the memory of the DSN, the method continues at step 310 where the processing module executes at least one of a variety of response approaches. A first response approach includes deleting the threshold number of error-free encoded data slices and deleting addressing information regarding the data segment. A second response approach includes sending a query regarding re-adding the data segment to the rebuilding list. A third response approach includes confirming non-rebuilding of encoded data slices of the set of encoded data slices. A fourth response approach includes detecting when less than the threshold number of encoded data slices are available for the data segment and when the less than the threshold number of encoded data slices are available for the data segment, deleting the less than the threshold number of encoded data slices and deleting the addressing information regarding the data segment or replacing the data segment with null data.

When the alternative sequence has been selected and the data segment has been removed from the rebuilding list, the method continues at step 312 where the processing module identifies other data segments of a plurality of data segments, where the plurality of data segments include the data segment and corresponds to at least one data object. The method continues at step 314 where the processing module determines whether at least some of the other data segments have been removed from the rebuilding list. When at least a predetermined number of other data segments have been removed from the rebuilding list, the method continues at step 316 where the processing module determines whether the at least the predetermined number of other data segments have at least a threshold number of encoded data slices available. When the at least the predetermined number of other data segments does not have at least the threshold number of encoded data slices available, the method continues at step 318 where the processing module deletes the at least one data object from the memory of the DSN.

Figure 21C:
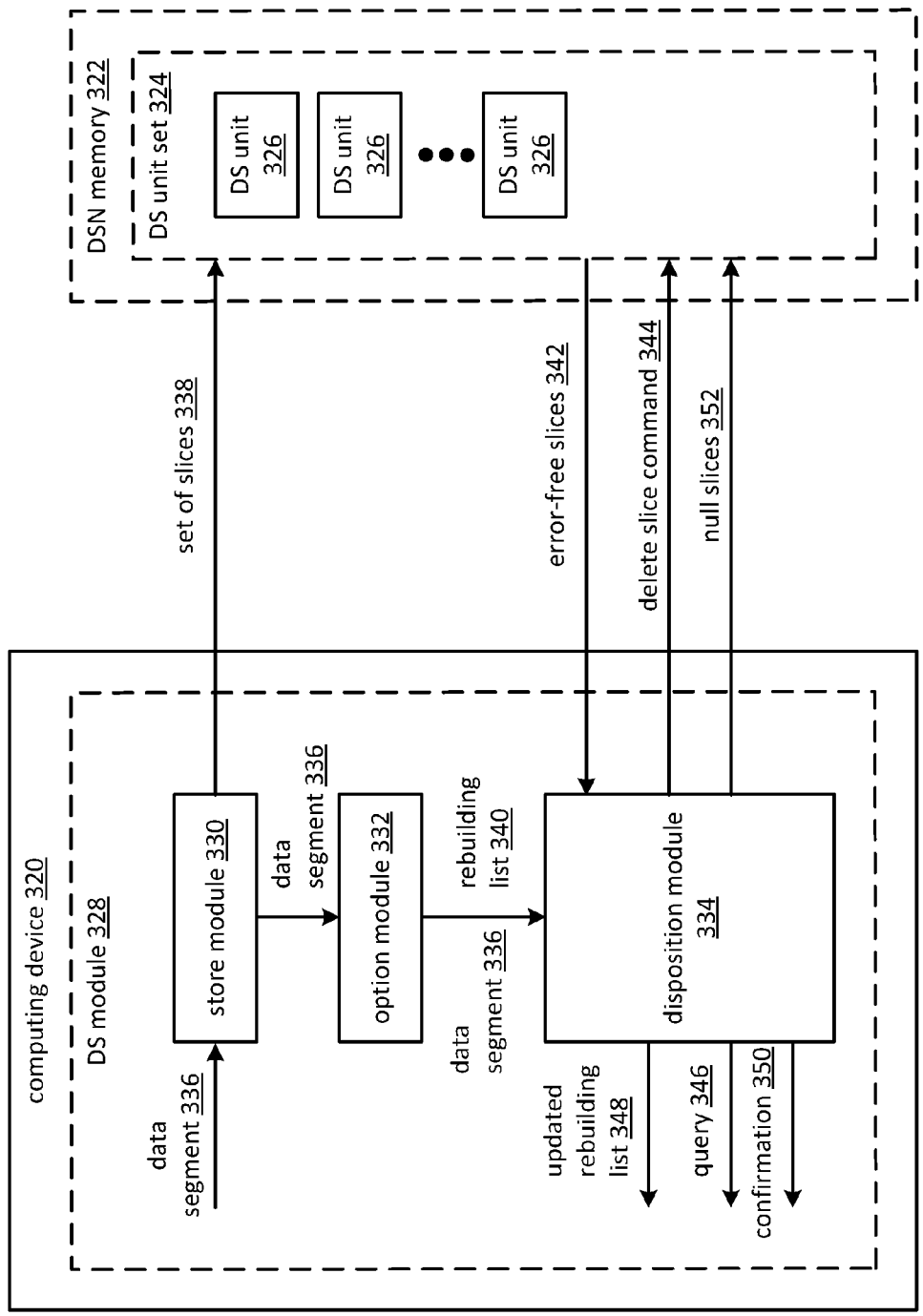
FIG. 21C is a schematic block diagram of another embodiment of a dispersed storage network (DSN) in accordance with the invention.

FIG. 21C is a schematic block diagram of another embodiment of a dispersed storage network (DSN) that includes a computing device 320 and a dispersed storage network (DSN) memory 322. The DSN memory 322 may be implemented utilizing one or more of a distributed storage and task network (DSTN), a DSTN module, a plurality of storage nodes, one or more dispersed storage (DS) unit sets 324, and a plurality of distributed storage (DS) units 326. Each DS unit 326 may be implemented utilizing at least one of a storage server, a storage unit, a storage module, a memory device, a memory, a distributed storage and task (DST) execution unit, a user device, a DST processing unit, and a DST processing module. The computing device 320 may be implemented utilizing at least one of a server, a storage unit, a DSTN managing unit, a DSN managing unit, a DS unit 326, a storage server, a storage module, a DS processing unit, a DST execution unit, a user device, a DST processing unit, and a DST processing module. For example, computing device 320 is implemented as the DS processing unit. The computing device 320 includes a dispersed storage (DS) module 328. The DS module 328 includes a store module 330, an option module 332, and a disposition module 334.

The system functions to store a data segment 336 in the DSN memory 322, determine a rebuilding option regarding the data segment 336, and determine a disposition of the data segment 336. With regards to the storing the data segment 336 in the DSN memory 322, the store module 330 stores a set of encoded data slices 338 in the DSN memory 322 (e.g., in the DS unit set 324), where the data segment 336 is encoded using an error coding dispersal storage function to produce the set of encoded data slices 338.

With regards to the determining the rebuilding option regarding the data segment 336, the option module 332 determines the rebuilding option regarding the data segment 336 is to not include the data segment 336 on a rebuilding list 340, where encoded data slices of data segments identified in the rebuilding list 340 are checked via a rebuilding process to detect errors and, when one of the encoded data slices has an error, the rebuilding process rebuilds the one of the encoded data slices.

With regards to determining the disposition of the data segment, the disposition module 334 determines the disposition of the data segment 336 when the set of encoded data slices 338 includes a threshold number (e.g., greater than a decode threshold number) of error-free encoded data slices 342 remaining in the DSN memory 322 (e.g., retrieved error-free slices 342). The disposition module 334 determines the disposition of the data segment 336 by at least one of a variety of disposition approaches. A first disposition approach includes the disposition module 334 deleting the threshold number of error-free encoded data slices (e.g., issuing delete slice commands 344 to the DSN memory 322) and deleting addressing information regarding the data segment. A second disposition approach includes the disposition module 334 sending a query 346 regarding adding the data segment 336 to the rebuilding list 340 to produce an updated rebuilding list 348. A third disposition approach includes the disposition module 334 confirming non-rebuilding of encoded data slices of the set of encoded data slices 338 (e.g., issuing confirmation 350).

A fourth disposition approach includes the disposition module 334 detecting when less than the threshold number of encoded data slices are available for the data segment 336 and, when the less than the threshold number of encoded data slices are available for the data segment 336, deleting the less than the threshold number of encoded data slices (e.g., issuing delete slice commands 344) and deleting the addressing information regarding the data segment. A fifth disposition approach includes the disposition module 334 detecting when less than the threshold number of encoded data slices are available for the data segment 336, and, when the less than the threshold number of encoded data slices are available for the data segment 336, replacing the data segment with null data (e.g., generating and outputting null slices 352 to the DSN memory 322).

Alternatively, or in addition to, the option module 332 identifies other data segments of a plurality of data segments, where the plurality of data segments includes the data segment and corresponds to at least one data object, and determines whether at least some of the other data segments are not in the rebuilding list 340. When at least a predetermined number of other data segments are not in the rebuilding list 340, the disposition module 334 determines whether the at least the predetermined number of other data segments have at least a threshold number of encoded data slices available and when the at least the predetermined number of other data segments does not have at least the threshold number of encoded data slices available, the disposition module 334 deletes the at least one data object from the DSN memory 322 (e.g., issuing delete slice command 344).

Figure 21D:
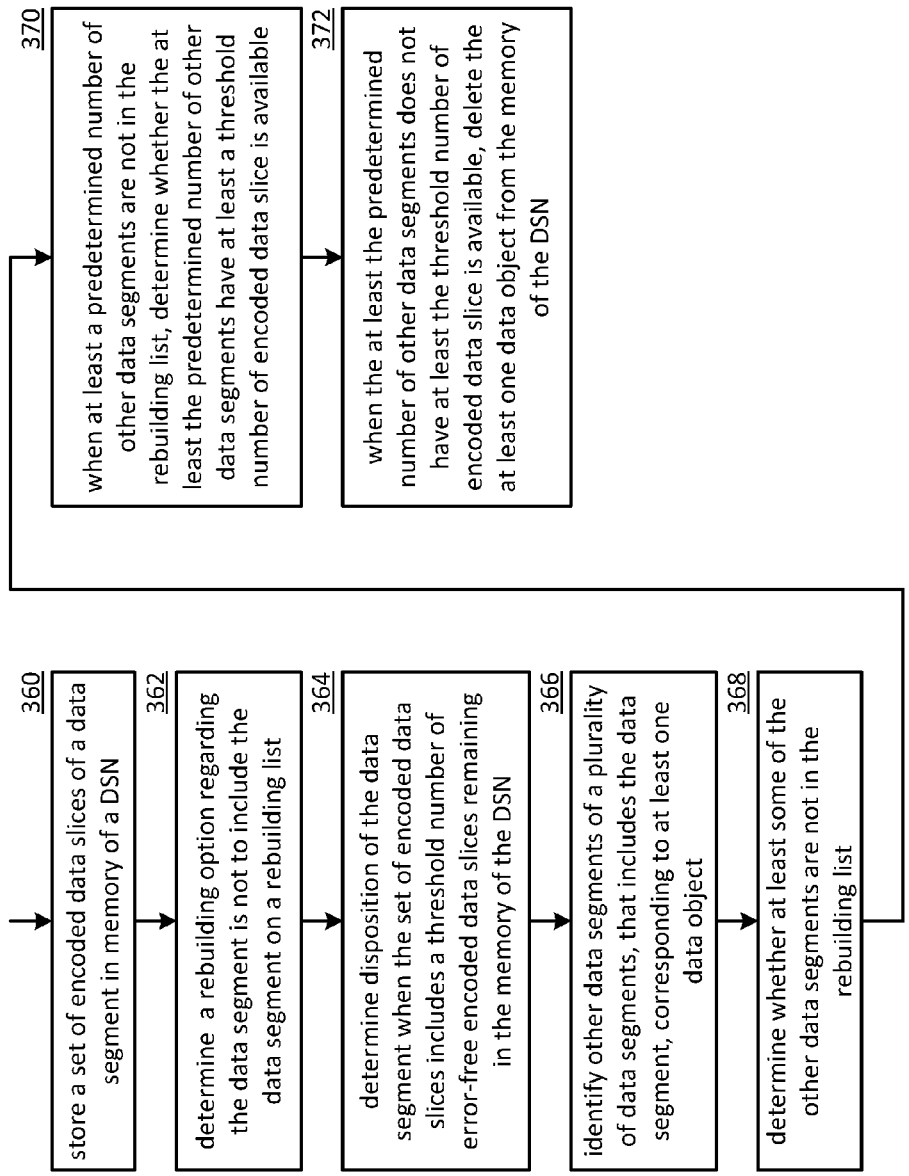
FIG. 21D is a flowchart illustrating another example of rebuilding a data segment in accordance with the invention.

FIG. 21D is a flowchart illustrating another example of rebuilding a data segment in accordance with the invention. The method begins at step 360 where a processing module (e.g., of a computing device within a dispersed storage network (DSN)) stores a set of encoded data slices in memory of the DSN, where a data segment is encoded using an error coding dispersal storage function to produce the set of encoded data slices. The method continues at step 362 where the processing module determines a rebuilding option regarding the data segment is to not include the data segment on a rebuilding list, where encoded data slices of data segments identified in the rebuilding list are checked via a rebuilding process to detect errors and, when one of the encoded data slices has an error, the rebuilding process rebuilds the one of the encoded data slices. For example, the processing module detects the error of the one of the encoded data slices and determines the rebuilding option is to not include the data segment on the rebuilding list when receiving an indication to not rebuild the data segment.

The method continues at step 364 where the processing module determines disposition of the data segment when the set of encoded data slices includes a threshold number (e.g., at least a decode threshold number) of error-free encoded data slices remaining in the memory of the DSN. The determining the disposition of the data segment includes one of a variety of disposition approaches. A first disposition approach includes deleting the threshold number of error-free encoded data slices and deleting addressing information regarding the data segment. A second disposition approach includes sending a query regarding adding the data segment to the rebuilding list. A third disposition approach includes confirming non-rebuilding of encoded data slices of the set of encoded data slices. A fourth disposition approach includes detecting when less than the threshold number of encoded data slices are available for the data segment and, when the less than the threshold number of encoded data slices are available for the data segment, deleting the less than the threshold number of encoded data slices and deleting the addressing information regarding the data segment. A fifth disposition approach includes detecting when less than the threshold number of encoded data slices are available for the data segment, and, when the less than the threshold number of encoded data slices are available for the data segment, replacing the data segment with null data.

The method continues at step 366 where the processing module identifies other data segments of a plurality of data segments, where the plurality of data segments includes the data segment and corresponds to at least one data object. For example, the processing module accesses a data segment list corresponding to the at least one data object. The method continues at step 368 where the processing module determines whether at least some of the other data segments are not in the rebuilding list. When at least a predetermined number of other data segments are not in the rebuilding list, the method continues at step 370 where the processing module determines whether the at least the predetermined number of other data segments have at least a threshold number of encoded data slices available. When the at least the predetermined number of other data segments does not have at least the threshold number of encoded data slices available, the method continues at step 372 where the processing module deletes the at least one data object from the memory of the DSN.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a computing device within a dispersed storage network (DSN), the method comprises:
   storing a set of encoded data slices in memory of the DSN, wherein a data segment is encoded using an error coding dispersal storage function to produce the set of encoded data slices;
   adding the data segment to a rebuilding list, wherein encoded data slices of data segments identified in the rebuilding list are checked via a rebuilding process to detect errors and, when one of the encoded data slices has an error, the rebuilding process rebuilds the one of the encoded data slices;
   in response to a condition, removing the data segment from the rebuilding list;
   when the data segment has been removed from the rebuilding list:
      identifying other data segments of a plurality of data segments, wherein the plurality of data segments includes the data segment and corresponds to at least one data object;
      determining whether at least some of the other data segments have been removed from the rebuilding list;
      when at least a predetermined number of other data segments has been removed from the rebuilding list, determining whether the at least the predetermined number of other data segments have at least a threshold number of encoded data slices available; and
      when the at least the predetermined number of other data segments does not have at least the threshold number of encoded data slices available, deleting the at least one data object from the memory of the DSN.

2. The method of claim 1, wherein the condition comprises at least one of:
   elapse of time;
   a user command;

a system administrator directive; and a passive expiration subscription.

3. The method of claim 1 further comprises, when the data segment has been removed from the rebuilding list:
   determining when the set of encoded data slices includes a threshold number of error-free encoded data slices remaining in the memory of the DSN; and
   when the set of encoded data slices includes the threshold number of error-free encoded data slices remaining in the memory of the DSN, deleting the threshold number of error-free encoded data slices and deleting addressing information regarding the data segment.

4. The method of claim 1 further comprises, when the data segment has been removed from the rebuilding list:
   determining when the set of encoded data slices includes a threshold number of error-free encoded data slices remaining in the memory of the DSN; and
   when the set of encoded data slices includes the threshold number of error-free encoded data slices remaining in the memory of the DSN, sending a query regarding re-adding the data segment to the rebuilding list.

5. The method of claim 1 further comprises, when the data segment has been removed from the rebuilding list:
   determining when the set of encoded data slices includes a threshold number of error-free encoded data slices remaining in the memory of the DSN; and
   when the set of encoded data slices includes the threshold number of error-free encoded data slices remaining in the memory of the DSN, confirming non-rebuilding of encoded data slices of the set of encoded data slices.

6. The method of claim 1 further comprises, when the data segment has been removed from the rebuilding list:
   determining when the set of encoded data slices includes a threshold number of error-free encoded data slices remaining in the memory of the DSN; and
   when the set of encoded data slices includes the threshold number of error-free encoded data slices remaining in the memory of the DSN:
      detecting when less than the threshold number of error-free encoded data slices are available for the data segment; and
      when the less than the threshold number of error-free encoded data slices are available for the data segment, deleting the less than the threshold number of error-free encoded data slices and deleting addressing information regarding the data segment.

7. The method of claim 1 further comprises, when the data segment has been removed from the rebuilding list:
   determining when the set of encoded data slices includes a threshold number of error-free encoded data slices remaining in the memory of the DSN; and
   when the set of encoded data slices includes the threshold number of error-free encoded data slices remaining in the memory of the DSN:
      detecting when less than the threshold number of encoded data slices are available for the data segment; and
      when the less than the threshold number of encoded data slices are available for the data segment, replacing the data segment with null data.

8. A method for execution by a computing device within a dispersed storage network (DSN), the method comprises:
   storing a set of encoded data slices in memory of the DSN, wherein a data segment is encoded using an error coding dispersal storage function to produce the set of encoded data slices;
   determining a rebuilding option regarding the data segment is to not include the data segment on a rebuilding list, wherein encoded data slices of data segments identified in the rebuilding list are checked via a rebuilding process to detect errors and, when one of the encoded data slices has an error, the rebuilding process rebuilds the one of the encoded data slices;
   determining disposition of the data segment when the set of encoded data slices includes a threshold number of error-free encoded data slices remaining in the memory of the DSN;
   identifying other data segments of a plurality of data segments, wherein the plurality of data segments includes the data segment and corresponds to at least one data object;
   determining whether at least some of the other data segments are not in the rebuilding list;
   when at least a predetermined number of other data segments is not in the rebuilding list, determining whether the at least the predetermined number of other data segments has at least a threshold number of encoded data slices available; and
   when the at least the predetermined number of other data segments does not have at least the threshold number of encoded data slices available, deleting the at least one data object from the memory of the DSN.

9. The method of claim 8, wherein the determining the disposition of the data segment comprises one of:
   deleting the threshold number of error-free encoded data slices and deleting addressing information regarding the data segment;
   sending a query regarding adding the data segment to the rebuilding list;
   confirming non-rebuilding of encoded data slices of the set of encoded data slices;
   detecting when less than the threshold number of error-free encoded data slices are available for the data segment and, when the less than the threshold number of error-free encoded data slices are available for the data segment, deleting the less than the threshold number of error-free encoded data slices and deleting addressing information regarding the data segment; and
   detecting when less than the threshold number of error-free encoded data slices are available for the data segment, and, when the less than the threshold number of error-free encoded data slices are available for the data segment, replacing the data segment with null data.

10. A dispersed storage (DS) module of a computing device within a dispersed storage network (DSN), the DS module comprises:
   a first module, when operable within the computing device, causes the computing device to:
      store a set of encoded data slices in memory of the DSN, wherein a data segment is encoded using an error coding dispersal storage function to produce the set of encoded data slices;
   a second module, when operable within the computing device, causes the computing device to:
      add the data segment to a rebuilding list, wherein encoded data slices of data segments identified in the rebuilding list are checked via a rebuilding process to detect errors and, when one of the encoded data slices has an error, the rebuilding process rebuilds the one of the encoded data slices; and
   a third module, when operable within the computing device, causes the computing device to:

in response to a condition, remove the data segment from the rebuilding list;
when the data segment has been removed from the rebuilding list:
 identify other data segments of a plurality of data segments, wherein the plurality of data segments includes the data segment and corresponds to at least one data object;
 determine whether at least some of the other data segments have been removed from the rebuilding list;
 when at least a predetermined number of other data segments have been removed from the rebuilding list, determine whether the at least the predetermined number of other data segments has at least a threshold number of encoded data slices available; and
 when the at least the predetermined number of other data segments does not have at least the threshold number of encoded data slices available, delete the at least one data object from the memory of the DSN.

11. The DS module of claim 10, wherein the condition comprises at least one of:
 elapse of time;
 a user command;
 a system administrator directive; and
 a passive expiration subscription.

12. The DS module of claim 10 further comprises, when the data segment has been removed from the rebuilding list: the third module further functions to:
 determine when the set of encoded data slices includes a threshold number of error-free encoded data slices remaining in the memory of the DSN; and
 when the set of encoded data slices includes the threshold number of error-free encoded data slices remaining in the memory of the DSN, delete the threshold number of error-free encoded data slices and deleting addressing information regarding the data segment.

13. The DS module of claim 10 further comprises, when the data segment has been removed from the rebuilding list: the third module further functions to:
 determine when the set of encoded data slices includes a threshold number of error-free encoded data slices remaining in the memory of the DSN; and
 when the set of encoded data slices includes the threshold number of error-free encoded data slices remaining in the memory of the DSN, send a query regarding re-adding the data segment to the rebuilding list.

14. The DS module of claim 10 further comprises, when the data segment has been removed from the rebuilding list: the third module further functions to:
 determine when the set of encoded data slices includes a threshold number of error-free encoded data slices remaining in the memory of the DSN; and
 when the set of encoded data slices includes the threshold number of error-free encoded data slices remaining in the memory of the DSN, confirm non-rebuilding of encoded data slices of the set of encoded data slices.

15. The DS module of claim 10 further comprises, when the data segment has been removed from the rebuilding list: the third module further functions to:
 determine when the set of encoded data slices includes a threshold number of error-free encoded data slices remaining in the memory of the DSN; and
 when the set of encoded data slices includes the threshold number of error-free encoded data slices remaining in the memory of the DSN:
  detect when less than the threshold number of error-free encoded data slices are available for the data segment; and
  when the less than the threshold number of error-free encoded data slices are available for the data segment, delete the less than the threshold number of error-free encoded data slices and deleting addressing information regarding the data segment.

16. The DS module of claim 10 further comprises, when the data segment has been removed from the rebuilding list: the third module further functions to:
 determine when the set of encoded data slices includes a threshold number of error-free encoded data slices remaining in the memory of the DSN; and
 when the set of encoded data slices includes the threshold number of error-free encoded data slices remaining in the memory of the DSN:
  detect when less than the threshold number of error-free encoded data slices are available for the data segment; and
  when the less than the threshold number of error-free encoded data slices are available for the data segment, replace the data segment with null data.

17. A dispersed storage (DS) module of a computing device within a dispersed storage network (DSN), the DS module comprises:
 a first module, when operable within the computing device, causes the computing device to:
  store a set of encoded data slices in memory of the DSN, wherein a data segment is encoded using an error coding dispersal storage function to produce the set of encoded data slices;
 a second module, when operable within the computing device, causes the computing device to:
  determine a rebuilding option regarding the data segment is to not include the data segment on a rebuilding list, wherein encoded data slices of data segments identified in the rebuilding list are checked via a rebuilding process to detect errors and, when one of the encoded data slices has an error, the rebuilding process rebuilds the one of the encoded data slices; and
 a third module, when operable within the computing device, causes the computing device to:
  determine disposition of the data segment when the set of encoded data slices includes a threshold number of error-free encoded data slices remaining in the memory of the DSN, wherein
 the second module further functions to:
  identify other data segments of a plurality of data segments, wherein the plurality of data segments includes the data segment and corresponds to at least one data object; and
  determine whether at least some of the other data segments are not in the rebuilding list; and
 the third module further functions to:
  when at least a predetermined number of other data segments is not in the rebuilding list, determine whether the at least the predetermined number of other data segments has at least a threshold number of encoded data slices available; and
  when the at least the predetermined number of other data segments does not have at least the threshold number of encoded data slices available, delete the at least one data object from the memory of the DSN.

18. The DS module of claim 17, wherein the third module functions to determine the disposition of the data segment by one of:
  deleting the threshold number of error-free encoded data slices and deleting addressing information regarding the data segment;
  sending a query regarding adding the data segment to the rebuilding list;
  confirming non-rebuilding of encoded data slices of the set of encoded data slices;
  detecting when less than the threshold number of error-free encoded data slices are available for the data segment and, when the less than the threshold number of error-free encoded data slices are available for the data segment, deleting the less than the threshold number of error-free encoded data slices and deleting addressing information regarding the data segment; and
  detecting when less than the threshold number of encoded data slices are available for the data segment, and, when the less than the threshold number of encoded data slices are available for the data segment, replacing the data segment with null data.

* * * * *